(12) United States Patent
Ha et al.

(10) Patent No.: US 6,620,655 B2
(45) Date of Patent: Sep. 16, 2003

(54) ARRAY SUBSTRATE FOR TRANSFLECTIVE LCD DEVICE AND METHOD OF FABRICATING THE SAME

(75) Inventors: Kyoung-Su Ha, Seoul (KR); Yong-In Park, Seoul (KR); Oh-Nam Kwon, Gyeonggi-do (KR); Woong-Kwon Kim, Gyeonggi-do (KR); Jae-Beom Choi, Gyeonggi-do (KR); Kyoung-Muk Lee, Seoul (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 24 days.

(21) Appl. No.: 09/984,805

(22) Filed: Oct. 31, 2001

(65) Prior Publication Data

US 2002/0105604 A1 Aug. 8, 2002

(30) Foreign Application Priority Data

Nov. 1, 2000 (KR) .......................... 2000-64739
Nov. 1, 2000 (KR) .......................... 2000-64740

(51) Int. Cl.[7] .......................... H01L 21/00; H01L 21/28
(52) U.S. Cl. .......................... 438/149; 438/151; 438/158; 438/161; 438/578; 349/114
(58) Field of Search .......................... 438/149, 151, 438/158, 161, 578; 349/114

(56) References Cited

U.S. PATENT DOCUMENTS

| | | | | |
|---|---|---|---|---|
| 5,594,259 A | * | 1/1997 | Shimada et al. | |
| 5,835,177 A | * | 11/1998 | Dohjo et al. | |
| 5,998,229 A | * | 12/1999 | Lyu et al. | |
| 6,207,480 B1 | * | 3/2001 | Cha et al. | |
| 6,355,510 B1 | * | 3/2002 | Kim | |
| 6,372,535 B1 | * | 4/2002 | Lyu | |
| 6,528,357 B2 | * | 3/2003 | Dojo et al. | |
| 6,531,392 B2 | * | 3/2003 | Song et al. | |
| 2002/0079494 A1 | * | 6/2002 | Kim et al. | |

* cited by examiner

Primary Examiner—John F. Niebling
Assistant Examiner—Stanetta Isaac
(74) Attorney, Agent, or Firm—Mckenna Long & Aldridge

(57) ABSTRACT

An array substrate for a transflective liquid crystal display device, including a substrate; at least one gate line and at least one gate electrode formed on the transparent substrate; a gate-insulating layer formed over the at least one gate line and the at least one gate electrode; a silicon layer formed on the gate-insulating layer, the silicon layer being positioned above the at least one gate electrode; a source electrode and a drain electrode formed on the silicon layer and spaced apart from each other with the silicon layer overlapped therebetween, wherein the at least one gate electrode, the source electrode, the drain electrode, and the silicon layer define a thin film transistor (TFT); at least one data line; a first passivation layer covering the at least one data line; a transparent electrode formed on the first passivation layer; and a reflective electrode formed on the transparent electrode.

35 Claims, 25 Drawing Sheets

ARRAY SUBSTRATE FOR TRANSFLECTIVE LCD DEVICE AND METHOD OF FABRICATING THE SAME

This application claims the benefit of Korean patent application Nos. 2000-64739 and 2000-64740, both filed on Nov. 1, 2000 in Korea, which is hereby incorporated by reference as if fully set forth herein.

BACKGROUND OF THE INVENTION

1. Field of the Invention

The present invention relates to a liquid crystal display device, and more particularly to a transflective liquid crystal display (LCD) device implementing selectable reflective and transmissive modes.

2. Discussion of the Related Art

Generally, a transflective LCD device has advantages of both a transmissive LCD device and a reflective LCD device. Because the transflective LCD device uses a back light as well as an ambient light source, it is not dependent upon exterior light source conditions, and consumes relatively low power.

FIG. 1 is an exploded perspective view illustrating a typical transflective LCD device. The transflective LCD device 11 includes an upper substrate 15 and a lower substrate 21 that are opposed to each other, and a liquid crystal layer 23 interposed therebetween. The upper substrate 15 and the lower substrate 21 are called a color filter substrate and an array substrate, respectively. On the upper substrate 15, a black matrix 16 and a color filter layer 17 including a plurality of red (R), green (G), and blue (B) color filters are formed. The black matrix 16 surrounds each color filter such that an array matrix feature is formed. Further on the upper substrate 15, a common electrode 13 is formed to cover the color filter layer 17 and the black matrix 16.

On the lower substrate 21 opposing the upper substrate 15, thin film transistors (TFTs) "T", as switching elements, are formed in shape of an array matrix corresponding to the color filter layer 17. In addition, a plurality of crossing gate and data lines 25 and 27 are positioned such that each TFT "T" is located near each crossing portion of the gate and data lines 25 and 27. The crossing gate and data lines define a pixel region "P". On the pixel region "P", a pixel electrode 19 is formed. The pixel electrode 19 includes a transmissive portion "A" and a reflective portion "C".

FIG. 2 is a schematic cross-sectional view illustrating operation modes of the typical transflective LCD device 11. As shown, the transflective LCD device 11 includes the upper substrate 15 having the common electrode 13, the lower substrate 21 having the pixel electrode 19, the liquid crystal layer 23 interposed therebetween, and a back light 41 disposed below the lower substrate 21. The pixel electrode 19 includes a reflective electrode 19b having a through-hole "A" and a transparent electrode 19a positioned below the reflective electrode 19b. The transparent electrode 19a is separated from the reflective electrode 19b by a passivation layer 20 interposed therebetween.

For a reflective mode, the transflective LCD device 11 uses a first ray "B" of ambient light, which may radiate from an exterior natural light source or from an exterior artificial light source. The first ray "B" passes through the upper substrate 15 and is reflected by the reflective electrode 19b back through the liquid crystal layer 23, which is aligned by the application of an electric field between the reflective electrode 19b and the common electrode 13. Accordingly, the aligned liquid crystal layer 23 controls the first ray "B" so as to display an image.

For a transmissive mode, the transflective LCD device 11 uses a second ray "F" of light, which radiates from the back light 41. The second ray "F" sequentially passes through the transparent electrode 19a, the through-hole "A" of reflective electrodes 19b and the liquid crystal layer 23 which is aligned by the application of an electric field between the transparent electrode 19a and the common electrode 13. Accordingly, the aligned liquid crystal layer 23 controls the second ray "F" so as to display an image.

FIG. 3 is an expanded plan view illustrating a portion of an array substrate for a conventional transflective LCD device. As shown in FIG. 3, gate lines 25 are arranged in a transverse direction, and data lines 27 are arranged perpendicular to the gate lines 25. Both the gate lines 25 and the data lines 27 are formed upon an array substrate 21 (in FIG. 1), and a pair of gate lines 25 and data lines 27 define a pixel region "P". Each of thin film transistors (TFTs) "T" is arranged at a position where both the gate line 25 and the data line 27 cross one another. A pixel electrode 19 comprising both a transparent electrode 19a and a reflective electrode 19b is disposed on the pixel region "P" defined by the gate line 25 and data line 27.

Each TFT "T" includes a gate electrode 32 to which a scanning signal is applied, a source electrode 33 to which a video signal is applied, and a drain electrode 35 which inputs the video signal to the pixel electrode 19. Further, each TFT "T" includes an active layer 34 between the source electrode 33 and the drain electrode 35. A portion of the gate line 25 defines a storage capacitor "S" with a portion of the pixel electrode 19. Furthermore, gate pads 29 and data pads 31 are respectively disposed at end portions of gate lines 25 and data lines 27. The gate pads 29 and the data pads 31 are to be electrically connected with a drive IC (not shown).

Still referring to FIG. 3, the pixel electrode 19 is a transflective electrode having both the transparent electrode 19a and the reflective electrode 19b. Specifically, the transparent electrode 19a is first formed on the pixel region "P", and is electrically connected with the drain electrode 35. Then, the reflective electrode 19b is formed over the transparent electrode 19a, and is also electrically connected with the drain electrode 35 via the transparent electrode 19a. Thus, the reflective electrode 19b has a through hole "A" corresponding to a transmissive portion of the LCD device 11 such that rays of back light 41 (in FIG. 2) can pass through the through hole "A" for function in the transmissive mode. Portion "C" of the reflective electrode 19b serves as a reflective portion of the LCD device 11 such that rays of the ambient light are thereby reflected.

In the above-mentioned structure, however, two patterning processes are respectively required when forming the transparent electrode 19a and the reflective electrode 19b. At this time of patterning, the transparent electrode 19a and the reflective electrode 19b are corroded by an etching solution due to Galvanic corrosion. Accordingly, to solve this problem, an insulator (e.g., the passivation layer 20 of FIG. 2) is interposed between the transparent electrode 19a and the reflective electrode 19b.

With reference to FIGS. 4A to 4D, 5A to 5D and 6A to 6D, a fabrication process for the conventional array substrate is explained. FIGS. 4A to 4D are sequential cross-sectional views taken along line IV—IV of FIG. 3, FIGS. 5A to 5D are sequential cross-sectional views taken along line V—V of FIG. 3, and FIGS. 6A to 6D are sequential cross-sectional views taken along line VI—VI of FIG. 3.

At first, as shown in FIGS. 4A, 5A and 6A, a first metal is deposited and patterned upon a transparent substrate 21 such that a gate pad 29, a gate line 25, and a gate electrode 32 are formed. For the first metal, aluminum (Al) or aluminum neodymium (AlNd) is conventionally employed. The gate line 25 extends from and is connected with the gate pad 29, and the gate electrode 32 protrudes from the gate line 25 (in FIG. 3). Thereafter, a gate-insulating layer 43 is formed on the transparent substrate 21 to cover the metal layer previously formed. The gate-insulating layer 43 may be an inorganic substance, such as silicon nitride ($SiN_x$) or silicon oxide ($SiO_2$). Subsequently, amorphous silicon (a-Si) and impurity-doped amorphous silicon ($n^+/p^+$ a-Si) are formed in series on the gate-insulating layer 43. The amorphous silicon and impurity-doped amorphous silicon are simultaneously patterned to form an active layer 34 and an ohmic contact layer 47, respectively. The active layer 34 is formed on the gate-insulating layer 43, particularly over the gate electrode 32 and the ohmic contact layer 47 is formed on the active layer 34. Also, a source electrode 33 and a drain electrode 35 are formed of a second metal on the ohmic contact layer 47. By depositing and patterning this second metal, not only are the source electrode 33 and the drain electrode 35 formed, but the data line 27, a capacitor electrode 49 and a data pad 31 are also formed on the gate-insulating layer 43 such that the source electrode 33 extends from the data line 27. The source electrode 33 and the drain electrode 35 are spaced apart from each other and respectively overlap opposite ends of the gate electrode 32. The capacitor electrode 49 overlaps a portion of the gate line 25 to define the storage capacitor "S" of FIG. 3. Moreover, a portion of the ohmic contact layer 47 between the source electrode 33 and drain electrode 35 is eliminated to form a channel region "CH."

Now referring to FIGS. 4B, 5B and 6B, a first passivation layer 51 is formed on and over the above-mentioned intermediates by depositing an organic substance such as BCB (benzocyclobutene) or an acryl-based resin. By patterning the first passivation layer 51, a first drain contact hole 53 that exposes a portion of the drain electrode 35 is formed. At this time, a first capacitor contact hole 57 and a first data pad contact hole 61 are also formed by patterning the first passivation layer 51. Furthermore, by patterning both the first passivation layer 51 and the gate-insulating layer 43, an etching hole 55 corresponding to the through-hole "A" and a first gate pad contact hole 59 are formed. The first capacitor contact hole 57 exposes a portion of the capacitor electrode 49, the first gate pad contact hole 59 exposes a portion of the gate pad 29, and the first data pad contact hole 61 exposes a portion of the data pad 31. Thereafter, a transparent conductive material, such as indium tin oxide (ITO) or indium zinc oxide (IZO), is deposited upon the first passivation layer 51 having the holes and subsequently patterned to form a transparent electrode 19a, a gate pad terminal 65 and a data pad terminal 67. The transparent electrode 19a electrically contacts the drain electrode 35 through the first drain contact hole 53, and the gate pad terminal 65 electrically contacts the gate pad 29 through the first gate pad contact hole 59. Additionally, the data pad terminal 67 electrically contacts the data pad 31 through the first data pad contact hole 61. At this point, the transparent electrode 19a preferably overlaps portions of the gate line 25 and contacts the capacitor electrode 49, and thus the transparent electrode 19a and the capacitor electrode 49 acts as one capacitor electrode in the storage capacitor "S". Further, a portion of the gate line 25 acts as the other capacitor electrode in the storage capacitor "S".

Next, as shown in FIGS. 4C, 5C and 6C, an insulating material such as silicon oxide, for example, is deposited upon the transparent electrode 19a and subsequently patterned to form a second passivation layer 69. The second passivation layer 69 comprises a second drain contact hole 53a positioned over the drain electrode 35 and a second capacitor contact hole 57a over the capacitor electrode 49. Thereafter, a third metal is deposited upon the second passivation layer 69 and subsequently patterned to form a reflective electrode 19b having a through-hole "A". The third metal is preferably aluminum (Al) or aluminum alloy (e.g., aluminum neodymium (AlNd)) which have low resistance and high reflectance properties. The reflective electrode 19b electrically contacts the transparent electrode 19a via the second drain contact hole 53a and second capacitor contact hole 57a such that the reflective electrode 19b and the drain electrode 65 are electrically interconnected. Namely, a first portion of the reflective electrode 19b is electrically connected with the drain electrode 35 through the second drain contact hole 53a, and a second portion of the reflective electrode 19b is electrically connected with the capacitor electrode 49 through the second capacitor contact hole 57a.

Next, referring to FIGS. 4D, 5D and 6D, exposed portions of the second passivation layer 69 are patterned to form a second gate pad contact hole 59a over the gate pad 29 and a second data pad contact hole 61a over the data pad 31. Therefore, the conventional array substrate for the LCD device is complete.

In the above-mentioned structure, the reason for forming the etching hole 55 corresponding the through-hole "A" is to get the uniform color purity of the light in both the transmissive mode and reflective mode. Namely, by matching the light-passing distances between the transmissive mode and reflective mode, the uniform color purity is achieved regardless of whether the ambient light is reflected in the reflective portion "C" or the artificial light passes through the transmissive portion "A" (i.e., through-hole).

Further, since the second passivation layer 69 is disposed between the transparent electrode 19a and the reflective electrode 19b, the electrode corrosion caused by the etching solution (that etches the reflective electrode 19b) is prevented. Namely, Galvanic corrosion caused by the etching solution between the transparent electrode 19a and the reflective electrode 19b does not occur due to the fact that the second passivation layer 69 prevents the corrosion of the transparent electrode 19a. Now the mechanism wherein the corrosion is prevented will be described below.

As well known, the equilibrium potential (oxidation potential) of the anode reaction of aluminum (Al) is lower than the equilibrium potential (reduction potential) of the cathode reaction of the transparent electrode, e.g., ITO or IZO. As a result, when Al and ITO/IZO are brought into contact with each other and immersed in the etching solution for the reflective electrode, the Al and the ITO/IZO exchange electrons therebetween while Galvanic corrosion proceeds in the interfaces between the Al, the etching solution and the ITO.

However, when forming the passivation layer 69 between the transparent electrode 19a and the reflective electrode 19b, although Galvanic corrosion is prevented, additional processes, such as mask processes and patterning processes, are required. Namely, the second passivation layer 69, as shown in FIG. 4D, is patterned to open the gate pad terminal 65 and the data pad terminal 67.

Furthermore, if the gate-insulating layer 43 and the first passivation layer 51 are not formed properly, these insulator (the gate-insulating layer 43 and the first passivation layer 51) have defects such as cracks and pin-holes therein. Thus, when etching the transparent conductive material (ITO or IZO) to form the transparent electrode 19a, the corrosion of the transparent material occurs due to the etching solution for the transparent conductive material. Namely, it is supposed that the transparent conductive material and the etching solution make contacts with the aluminum (patterned first metal) through pin-holes or the like formed in the gate-insulating layer and the first passivation layer.

Accordingly, as mentioned before, the conventional array substrate needs additional fabricating processes and consumes more time and costs, and the gate line reacts with the transparent conductive material when defects are formed in the insulators, thereby decreasing the manufacturing yield of the LCD device.

SUMMARY OF THE INVENTION

Accordingly, the present invention is directed to a transflective LCD device that substantially obviates one or more of the problems due to limitations and disadvantages of the related art.

An object of the present invention is to provide a transflective LCD device having decreased manufacturing time and costs without Galvanic corrosion.

Another object of the present invention is to provide a transflective LCD device having increased manufacturing yield.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating an array substrate for use in a transflective liquid crystal display device includes the steps of forming a gate line, a gate electrode and a gate pad all having a first layer and a second layer structure on a substrate; forming a gate-insulating layer on the substrate to cover the double-layered gate line, the double-layered gate electrode and the double-layered gate pad; forming an active layer and an ohmic contact layer over the gate electrode; forming a data line, source and drain electrodes on the ohmic contact layer, a capacitor electrode over the gate line and a data pad at the end of the data line; forming a first passivation layer to cover the data line, source and drain electrodes, the capacitor electrode and the data pad, the first passivation layer having a first drain contact hole to the drain electrode, a etching hole corresponding to a transmissive portion, a first capacitor contact hole to the capacitor electrode, a first gate pad contact hole to the gate pad, and a data pad contact hole to the data pad; forming a gate pad terminal, a data pad terminal and a transparent electrode in the transmissive portion, the gate pad terminal contacting the gate pad through the first gate pad contact hole, the data pad terminal contacting the data pad through the first data pad contact hole, and transparent electrode contacting the drain electrode and capacitor electrode through the first drain and capacitor contact holes; forming a second passivation layer to cover the transparent electrode, the gate pad terminal and the data pad terminal, the second passivation layer having a second drain contact hole over the drain electrode, a second capacitor contact hole over the capacitor electrode, a second gate pad contact hole over the gate pad, and a second data pad contact hole over the data pad; forming a corrosion-resistant metal layer on the second passivation layer; forming an aluminum-based layer on the corrosion-resistant metal layer; and patterning the aluminum-based layer and the corrosion-resistant metal layer so as to form a double-layered reflective electrode and expose the gate pad terminal and data pad terminal.

The first layers of the gate line, gate electrode and gate pad are one of aluminum or aluminum neodymium. The second layers of the gate line, gate electrode and gate pad are titanium. The data line, source and drain electrodes, capacitor electrode and data pad are formed of chromium. The gate-insulating layer is a material selected from a group consisting of silicon oxide or silicon nitride. The gate pad terminal, data pad terminal and transparent electrode are formed of a transparent conductive material selected from a group consisting of indium tin oxide, indium zinc oxide and indium tin zinc oxide. The corrosion-resistant metal is molybdenum, while the aluminum-based layer is aluminum neodymium.

In another aspect, a method of fabricating an array substrate for use in a transflective liquid crystal display device includes the steps of forming a gate line, a gate electrode and a gate pad all having a single-layered structure on a substrate; forming a gate-insulating layer on the substrate to cover the gate line, the gate electrode and the gate pad; forming an active layer and an ohmic contact layer over the gate electrode; forming a data line, source and drain electrodes on the ohmic contact layer, a capacitor electrode over the gate line, and a data pad at the end of the data line, thereby defining intermediate structures; forming a first passivation layer to cover the intermediate structures, the first passivation layer having a first drain contact hole to the drain electrode, a etching hole corresponding to a transmissive portion, a first capacitor contact hole to the capacitor electrode, a gate pad contact hole to the gate pad, and a data pad contact hole to the data pad; forming a gate pad terminal, a data pad terminal and a transparent electrode in the transmissive portion, the gate pad terminal contacting the gate pad through the gate pad contact hole, the data pad terminal contacting the data pad through the first data pad contact hole, and transparent electrode contacting the drain electrode and capacitor electrode through the first drain and capacitor contact holes; forming a second passivation layer to cover the transparent electrode, the gate pad terminal and the data pad terminal, the second passivation layer having a second drain contact hole over the drain electrode and a second capacitor contact hole over the capacitor electrode; forming a reflective electrode having the transmissive portion on the second passivation layer; and patterning the second passivation layer using a dry etching method so as to expose the gate pad terminal and the data pad terminal.

In another aspect, a method of fabricating an array substrate for use in a transflective liquid crystal display device includes the steps of forming a gate line, a gate electrode and a gate pad on a substrate; forming a gate-insulating layer on the substrate to cover the gate line, the gate electrode and the gate pad; forming an active layer and an ohmic contact layer over the gate electrode; forming a data line, source and drain electrodes on the ohmic contact layer, a capacitor electrode over the gate line, and a data pad at the end of the data line, thereby defining first intermediate structures; forming a first passivation layer to cover the first intermediate structures, the first passivation layer having a first drain contact hole to the drain electrode, a etching hole corresponding to a transmissive portion, a first capacitor contact hole to the capacitor electrode, a first gate pad contact hole to the gate pad, and a first data pad contact hole to the data pad; forming a gate pad terminal, a data pad terminal and a transparent electrode in the transmissive portion, the gate pad terminal contacting the gate pad through the first gate pad contact hole, the data pad terminal contacting the data pad through the first data pad contact hole, and transparent electrode contacting the drain electrode and capacitor electrode through the first drain and capacitor contact holes, thereby defining second intermediate structures; forming a second passivation layer to cover the second intermediate structures, the second passivation layer having a second drain contact hole over the drain electrode, a second capacitor contact hole over the capacitor electrode, a second gate pad contact hole over the gate pad, and a second data pad contact hole over the data pad; forming a corrosion-resistant metal layer on the second passivation layer; forming an aluminum-based layer on the corrosion-resistant metal layer; patterning the aluminum-based layer so as to form a second layer of a double-layered reflective electrode having a transmissive portion; and pattering the corrosion-resistant metal layer so as to form a first layer of the double-layered reflective electrode having the transmissive portion.

In another aspect, a method of fabricating an array substrate for use in a transflective liquid crystal display device includes the steps of forming a gate line, a gate electrode and a gate pad on a substrate; forming a gate-insulating layer on the substrate to cover the gate line, the gate electrode and the gate pad; forming an active layer and an ohmic contact layer over the gate electrode; forming a data line, source and drain electrodes on the ohmic contact layer, a capacitor electrode over the gate line, and a data pad at the end of the data line, thereby defining first intermediate structures; forming a passivation layer to cover the first intermediate structures, the passivation layer having a drain contact hole to the drain electrode, a etching hole corresponding to a transmissive portion, a capacitor contact hole to the capacitor electrode, a gate pad contact hole to the gate pad, and a data pad contact hole to the data pad; forming a gate pad terminal, a data pad terminal and a transparent electrode in the transmissive portion, the gate pad terminal contacting the gate pad through the gate pad contact hole, the data pad terminal contacting the data pad through the data pad contact hole, and transparent electrode contacting the drain electrode and capacitor electrode through the drain and capacitor contact holes, thereby defining second intermediate structures; laser-treating the transparent electrode; forming a corrosion-resistant metal layer to cover the second intermediate structures; forming an aluminum-based layer on the corrosion-resistant metal layer; patterning the aluminum-based layer so as to form a second layer of a double-layered reflective electrode having a transmissive portion; and pattering the corrosion-resistant metal layer so as to form a first layer of the double-layered reflective electrode having the transmissive portion In another aspect, a method of fabricating an array substrate for use in a transflective liquid crystal display device includes the steps of forming a gate line, a gate electrode and a gate pad on a substrate; forming a gate-insulating layer on the substrate to cover the gate line, the gate electrode and the gate pad; forming an active layer and an ohmic contact layer over the gate electrode; forming a data line, source and drain electrodes on the ohmic contact layer, a capacitor electrode over the gate line, and a data pad at the end of the data line, thereby defining first intermediate structures; forming a passivation layer to cover the first intermediate structures, the passivation layer having a drain contact hole to the drain electrode, a etching hole corresponding to a transmissive portion, a capacitor contact hole to the capacitor electrode, a gate pad contact hole to the gate pad, and a data pad contact hole to the data pad; forming a gate pad terminal, a data pad terminal and a transparent electrode in the transmissive portion, the gate pad terminal contacting the gate pad through the gate pad contact hole, the data pad terminal contacting the data pad through the data pad contact hole, and transparent electrode contacting the drain electrode and capacitor electrode through the drain and capacitor contact holes, thereby defining second intermediate structures; laser-treating the transparent electrode; forming a reflective metal layer to cover the second intermediate structures, the reflective metal layer having a enough thickness; forming a photo resist on the reflective metal layer; patterning the photo resist using a photolithography process to expose potions of the reflective metal layer; etching half of the exposed reflective metal layer; removing the photo resist completely using a wet stripper; and etching the residual reflective metal layer so as to form a reflective electrode.

In another aspect, a transflective liquid crystal display device includes a substrate; at least one gate line and at least one gate electrode formed on the transparent substrate; a gate-insulating layer formed over the at least one gate line and the at least one gate electrode; a silicon layer formed on the gate-insulating layer, the silicon layer being positioned above the at least one gate electrode; a source electrode and a drain electrode formed on the silicon layer and spaced apart from each other with the silicon layer overlapped therebetween, wherein the at least one gate electrode, the source electrode, the drain electrode, and the silicon layer define a thin film transistor (TFT); at least one data line; a first passivation layer covering the at least one data line; a transparent electrode formed on the first passivation layer; and a reflective electrode formed on the transparent electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, which are illustrated in the accompanying drawings. Wherever possible, the same reference numbers will be used throughout the drawings to refer to the same or like parts. In the principal of the present invention, a plan view and explanation thereof are omitted since a plan view of an inventive array substrate is somewhat similar to that of a conventional art shown in FIG. 3.

Figure 1:
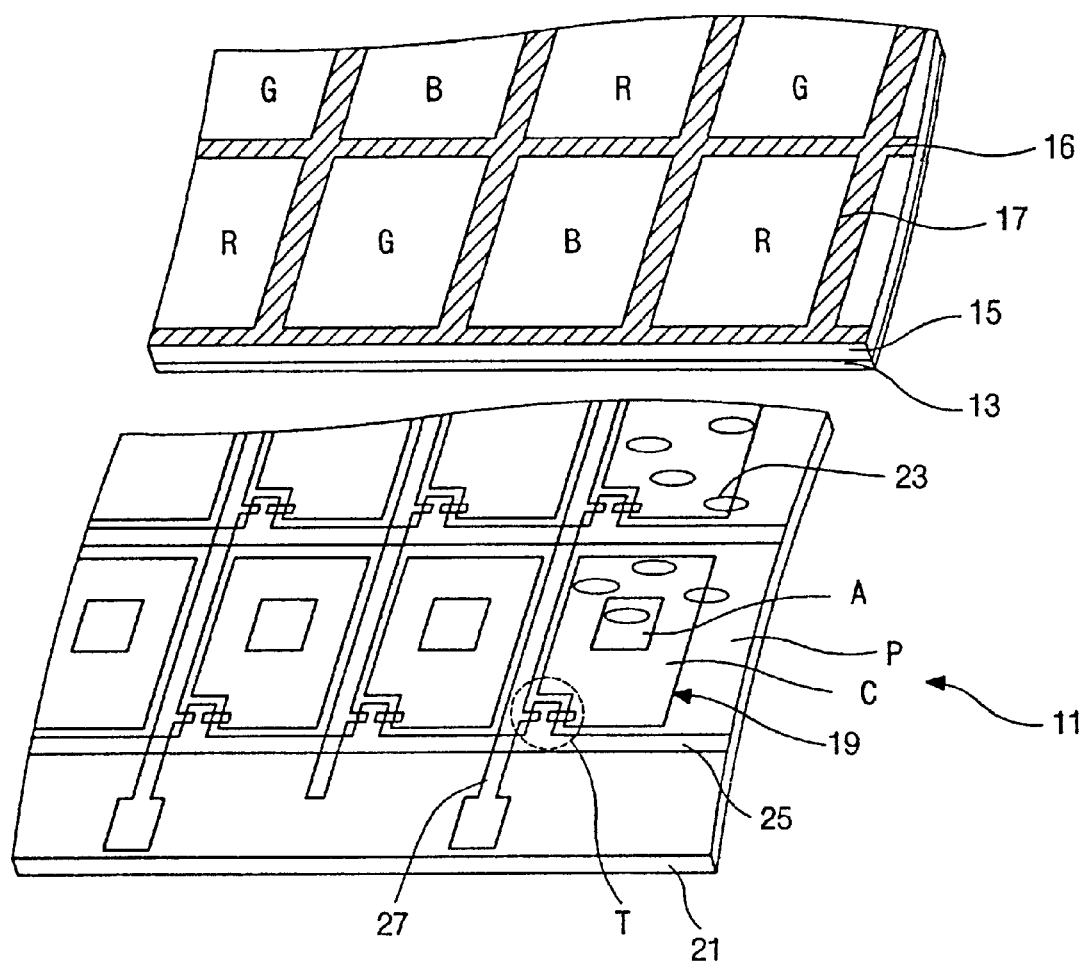
FIG. 1 is an exploded perspective view illustrating a typical transflective LCD device.
Figure 2:
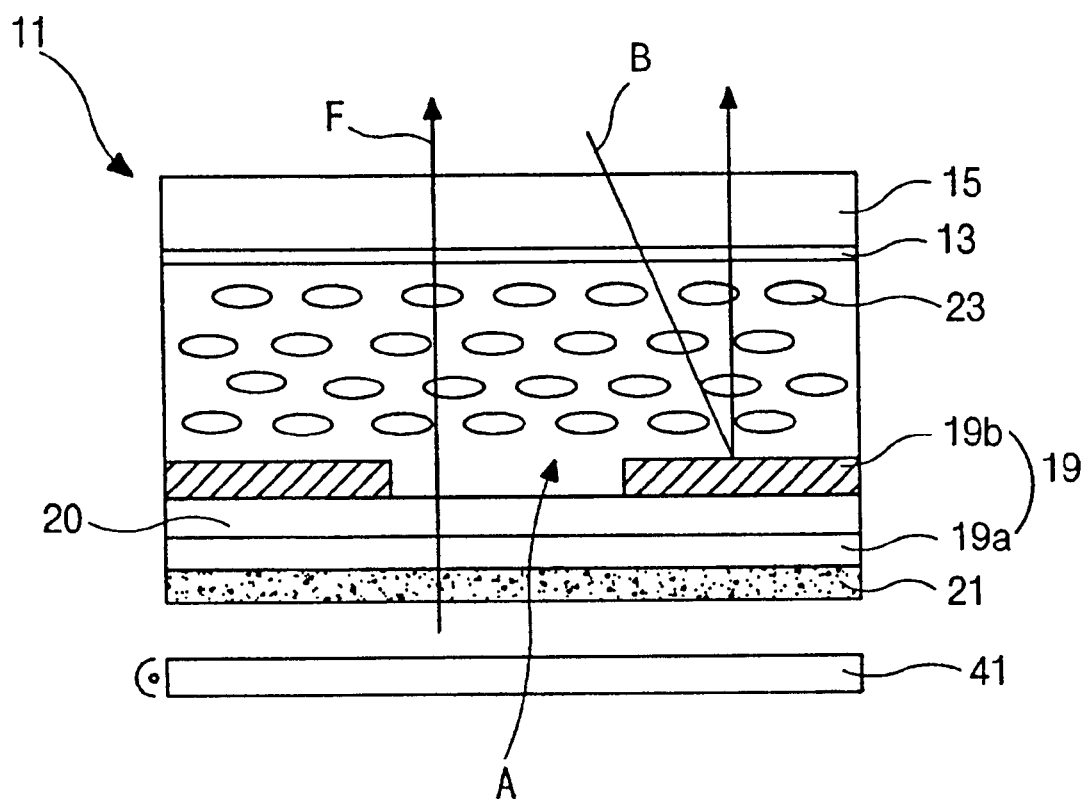
FIG. 2 is a schematic cross-sectional view illustrating an operation of a typical transflective LCD device.
Figure 3:
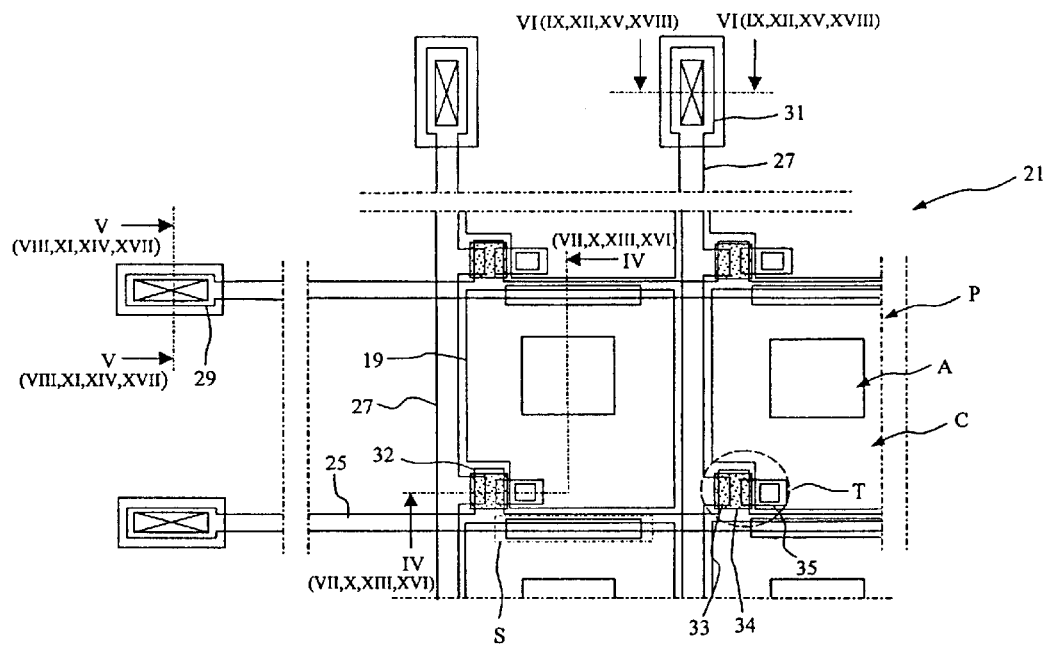
FIG. 3 is an expanded plan view illustrating a portion of an array substrate for a conventional transflective LCD device.
Figure 4A:
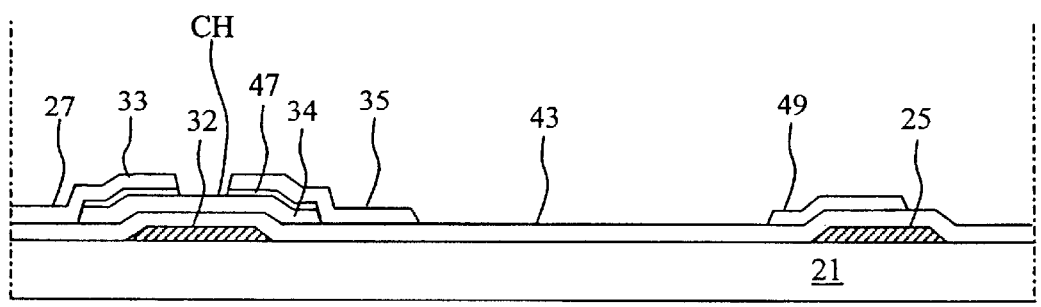
FIGS. 4A to 4D are sequential cross-sectional views taken along line IV—IV of FIG. 3.
Figure 4B:
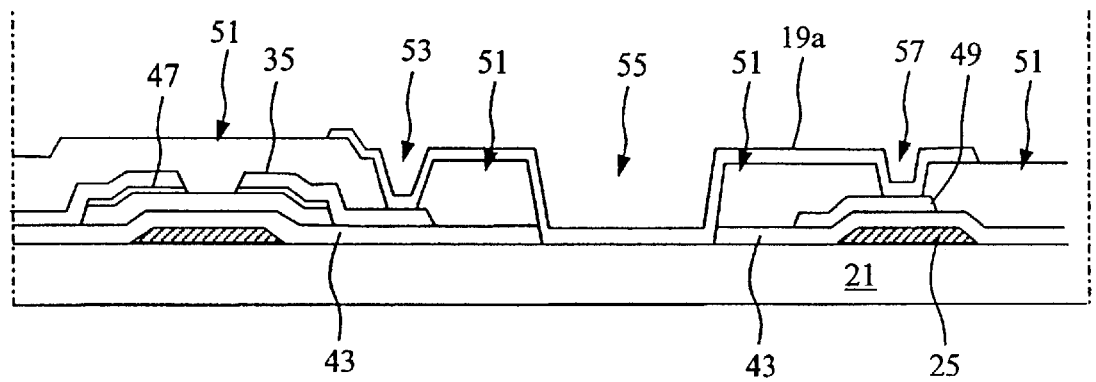
Figure 4C:
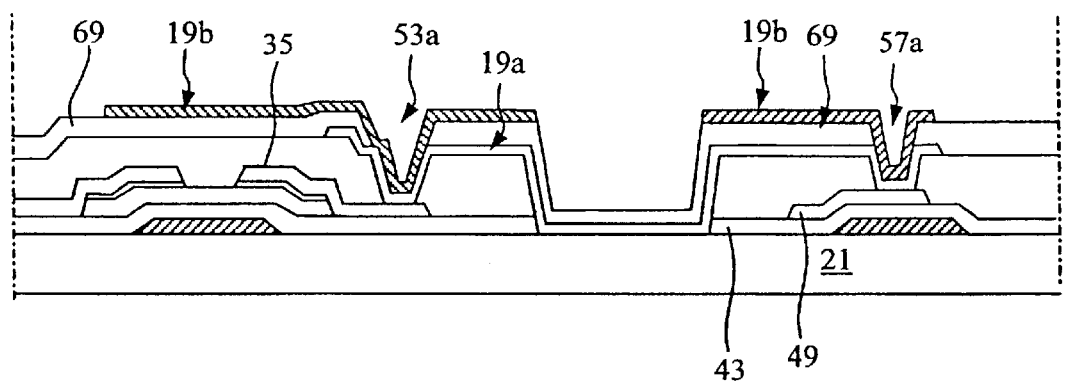
Figure 4D:
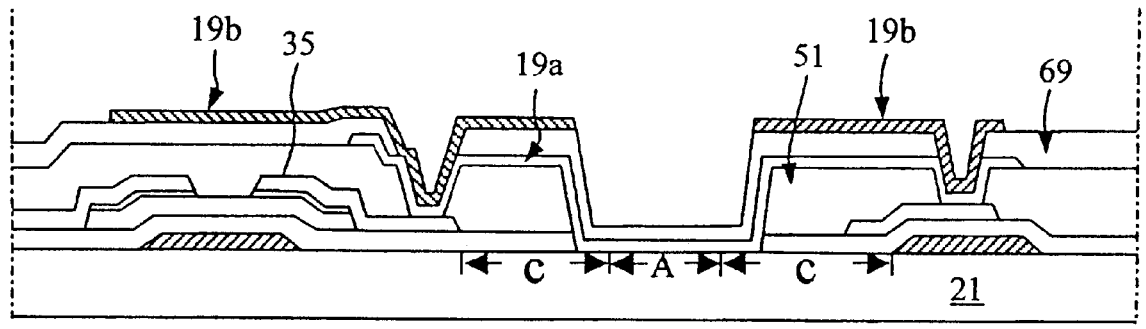
Figure 5A:
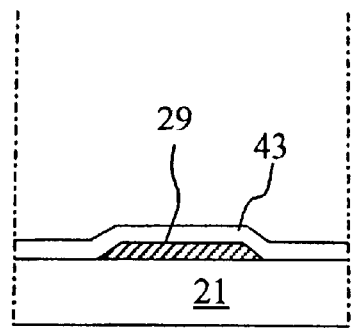
FIGS. 5A to 5D are sequential cross-sectional views taken along line V—V of FIG. 3.
Figure 5B:
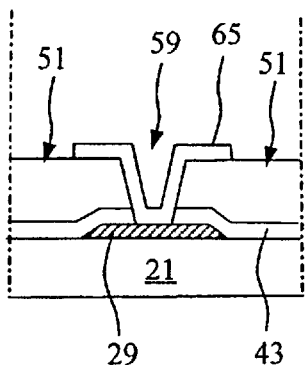
Figure 5C:
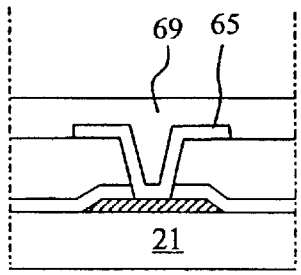
Figure 5D:
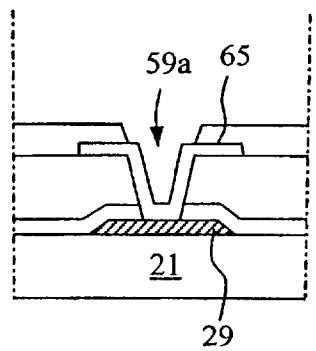
Figure 6A:
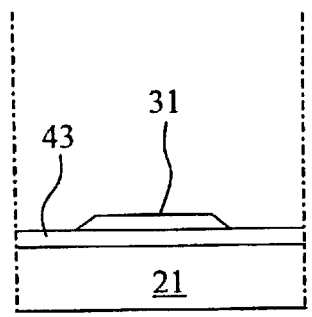
FIGS. 6A to 6D are sequential cross-sectional views taken along line VI—VI of FIG. 3.
Figure 6B:
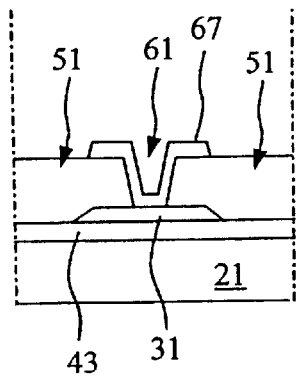
Figure 6C:
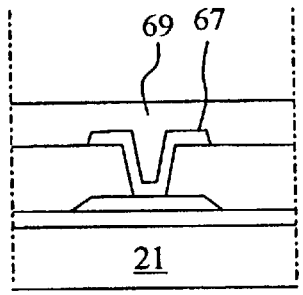
Figure 6D:
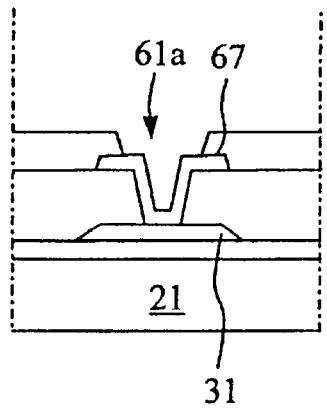

FIGS. 7A to 7F, 8A to 8F, and 9A to 9F are sequential cross-sectional views respectively taken along lines VII—VII, VIII—VIII, IX—IX of FIG. 3 according to a first embodiment of the present invention. In the first embodiment of the present invention, the gate electrode and gate line have double-layered structures using titanium (Ti) and aluminum-based material (e.g., aluminum neodymium (AlNd)). Furthermore, the reflective electrode also has double-layered structure using molybdenum (Mo) and aluminum (Al).

Figure 7A:
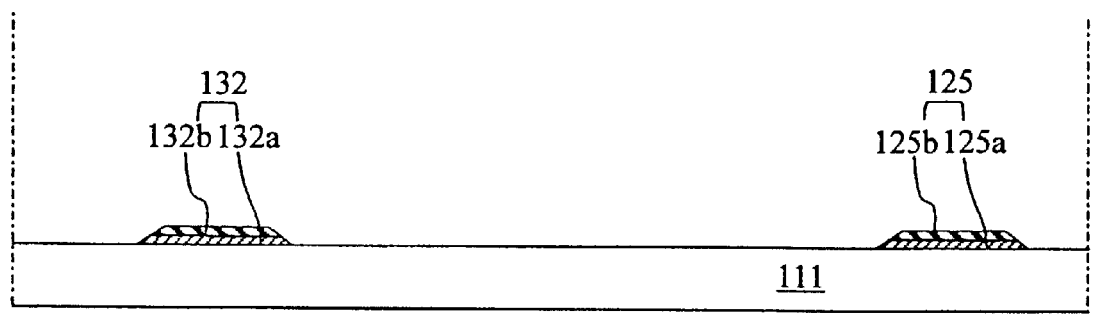
FIGS. 7A to 7F are sequential cross-sectional views taken along line VII—VII of FIG. 3 according to a first embodiment of the present invention.
Figure 8A:
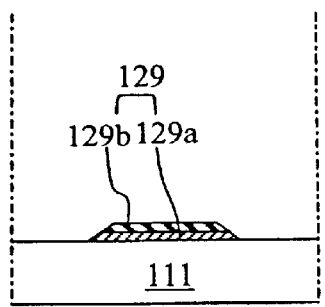
FIGS. 8A to 8F are sequential cross-sectional views taken along line VIII—VIII of FIG. 3 according to the first embodiment of the present invention.
Figure 9A:
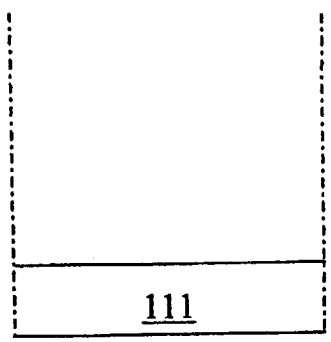
FIGS. 9A to 9F are sequential cross-sectional views taken along line IX—IX of FIG. 3 according to the first embodiment of the present invention.

Now, referring to FIGS. 7A, 8A and 9A, a first metal and a second metal are deposited on a substrate 111 and then patterned to form a double-layered gate line 125 arranged transversely upon the substrate 111, a double-layered gate pad 129 disposed at the end of the double-layered gate line 125 (in FIG. 3), and a double-layered gate electrode 132 extending from the double-layered gated line 125. The first metal for the first layers 125a, 129a and 132a is substantially aluminum-based material, such as aluminum neodymium (AlNd), while the second metal for the second layers 125b, 129b and 132b is substantially titanium (Ti). Pure aluminum (Al) is conventionally used as a metal for the gate line 125, gate pad 129 and gate electrode 132 because of its low resistance and reduced signal delay. However, pure aluminum is chemically weak when exposed to acidic processing and may result in formation of hillocks during high temperature processing. Accordingly, multi-layered aluminum structures, as shown in FIGS. 7A, 8A and 9A, are used for the gate line 125, pad 129 and electrode 132. Since the second layers 125b, 129b and 132b are formed of titanium (Ti), these second layers 125b, 129b and 132b protect the first layers 125a, 129a and 132a from the etching solution for the transparent conductive material although the gate-insulating layer and the passivation layer have cracks or pin-holes in a later steps, in contrast with the conventional art.

Figure 7B:
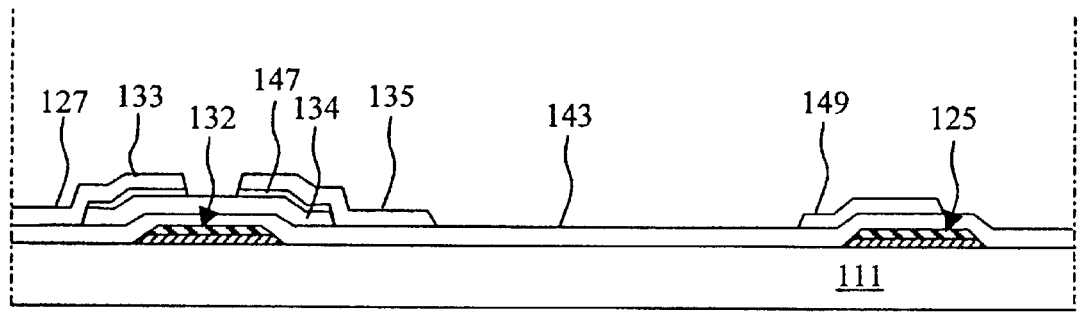
Figure 8B:
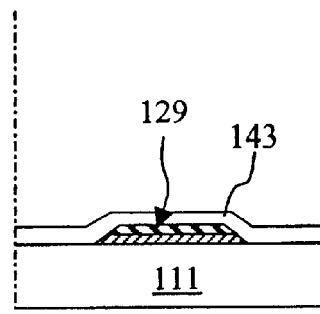
Figure 9B:
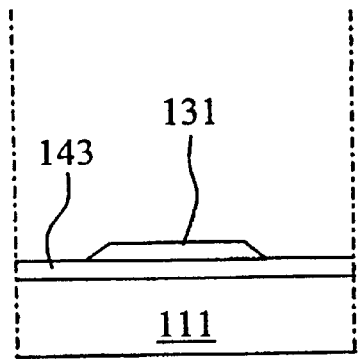

Next, referring to FIGS. 7B, 8B and 9B, a gate-insulating layer 143 is formed upon the entire surface of the substrate 111 to cover the patterned first and second metal layers. The gate-insulating layer 143 includes at least an inorganic substance, such as silicon oxide ($SiO_2$) or silicon nitride ($SiN_x$). Thereafter, an amorphous silicon (a-Si) and an impurity-doped amorphous silicon are sequentially formed and subsequently patterned into an island shape to form an active layer 134 and an ohmic contact layer 147 upon the gate-insulating layer 143, especially over the double-layered gate electrode 132. Thereafter, a third metal, especially chrome (Cr), is deposited upon the gate-insulating layer 143 to cover the ohmic contact layer 147 and then patterned to form a data line 127, a source electrode 133, a drain electrode 135, a capacitor electrode 149 and a data pad 131. The source electrode 133 protrudes from the data line 127, and the drain electrode 135 is spaced apart from the source electrode 133. The source electrode 133 and the drain electrode 135 overlap end portions of the active layer 134 with a center portion the active layer 134 positioned therebetween.

As mentioned before, the data line 127 is perpendicular to the double-layered gate line 125, and the data pad 131 is positioned at the end of the data line 127. The capacitor electrode 149 overlaps a portion of the double-layered gate line 125. An exposed portion of the ohmic contact layer 147 is etched away between the source electrode 133 and the drain electrode 135. At this point, since the top portions of the gate line 125, gate pad 129 and gate electrode 132 are formed of titanium (Ti), the firstly formed metal (i.e., the gate line 125, the gate pad 129 and the gate electrode 132) are not eroded or deteriorated by the etchant for chrome (i.e., third metal) although the gate-insulating layer 143 has cracks or pin-holes.

Figure 7C:
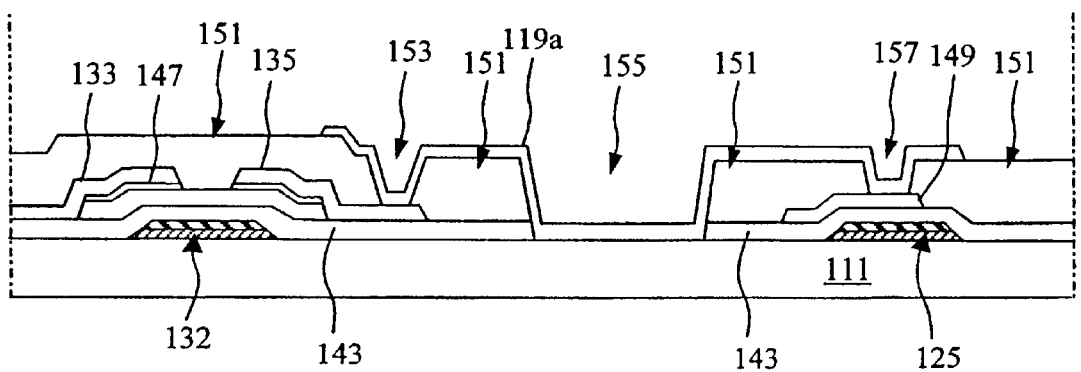
Figure 8C:
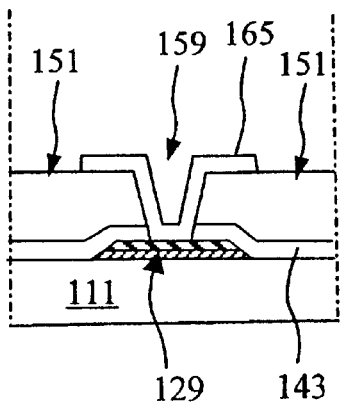
Figure 9C:
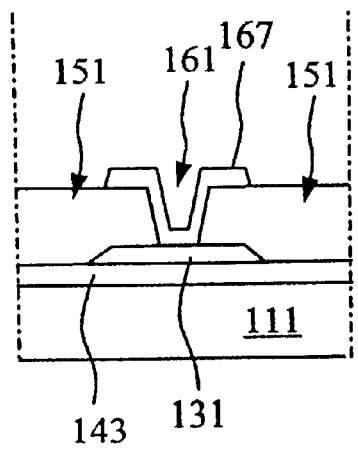

Referring to FIGS. 7C, 8C and 9C, a first passivation layer 151 is formed upon the source electrode 133, the drain electrode 135, the capacitor electrode 149 and the data line 131. The first passivation layer 151 includes at least one of an organic insulating material and an inorganic material. By patterning the first passivation layer 151, a first drain contact hole 153 that exposes a portion of the drain electrode 135 is formed. At this time, a first capacitor contact hole 157 and a first data pad contact hole 161 are also formed by patterning the first passivation layer 51. Furthermore, by patterning both the first passivation layer 151 and the gate-insulating layer 143, an etching hole 155 corresponding to the through-hole "A" and a first gate pad contact hole 159 are formed. The first capacitor contact hole 157 exposes a portion of the capacitor electrode 149, the first gate pad contact hole 159 exposes a portion of the gate pad 29, and the first data pad contact hole 161 exposes a portion of the data pad 131.

Thereafter, a transparent conductive material, such as indium tin oxide (ITO), indium zinc oxide (IZO) or indium tin zinc oxide (ITZO), is deposited upon the first passivation layer 151 having the holes and subsequently patterned to form a transparent electrode 119a, a gate pad terminal 165 and a data pad terminal 167. The transparent electrode 119a electrically contacts the drain electrode 135 through the first drain contact hole 153, and the gate pad terminal 165 electrically contacts the double-layered gate pad 129 through the first gate pad contact hole 159. Additionally, the data pad terminal 167 electrically contacts the data pad 131 through the first data pad contact hole 161. At this point, the transparent electrode 119a preferably overlaps portions of the double-layered gate line 125 and contacts the capacitor electrode 149, and thus the transparent electrode 119a and the capacitor electrode 149 acts as a first capacitor electrode in the storage capacitor "S" (in FIG. 3). Further, a portion of the double-layered gate line 125 acts as a second capacitor electrode in the storage capacitor "S" (in FIG. 3).

Figure 7D:
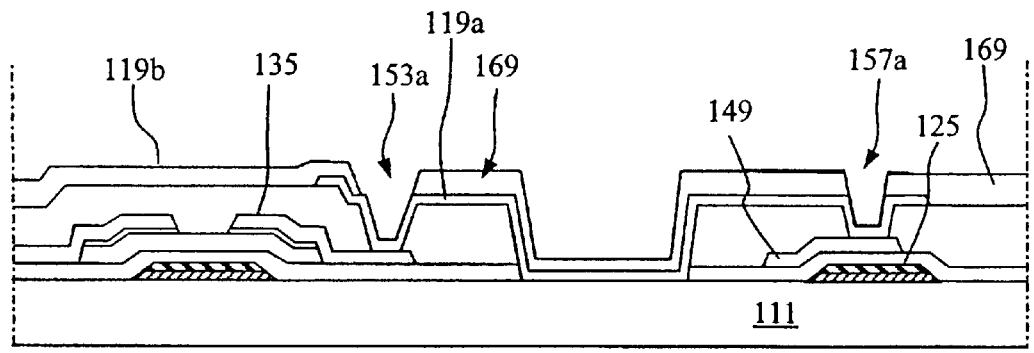
Figure 8D:
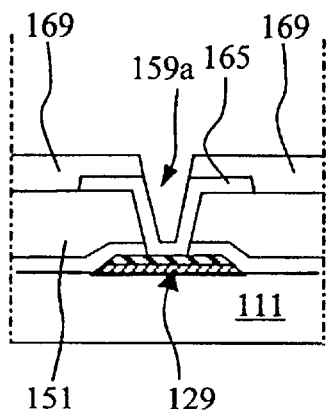
Figure 9D:
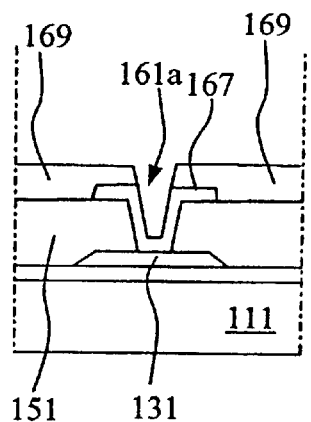

Now referring to FIGS. 7D, 8D and 9D, an insulating material such as silicon oxide or silicon nitride, for example, is deposited upon the transparent electrode 119a and subsequently patterned to form a second passivation layer 169. The second passivation layer 169 comprises a second drain contact hole 153a positioned over the drain electrode 135 and a second capacitor contact hole 157a over the capacitor electrode 149. At this time, a second gate pad contact hole 159a and a second data pad contact hole 161a are also formed by patterning the second passivation layer 169. As shown in FIGS. 8D and 9D, the second gate pad contact hole 159a exposes a portion of the double-layered gate pad 129, and the second data pad contact hole 161a exposes a portion of the data pad 131.

Figure 7E:
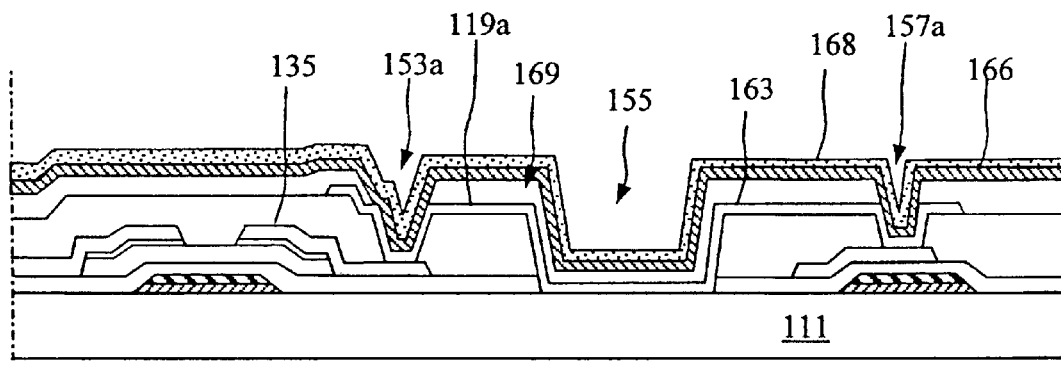
Figure 8E:
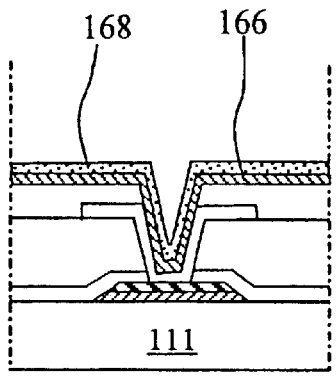
Figure 9E:
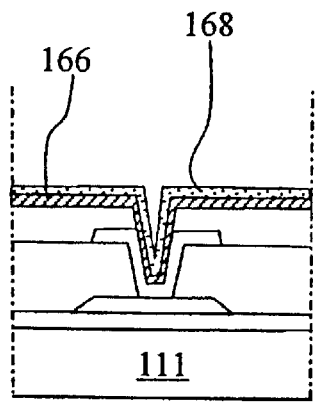

Next, referring to FIGS. 7E, 8E and 9E, molybdenum (Mo) 166 and aluminum-based material (e.g. aluminum neodymium (AlNd)) 168 are formed in series upon the second passivation layer 159 having the second contact holes.

Figure 7F:
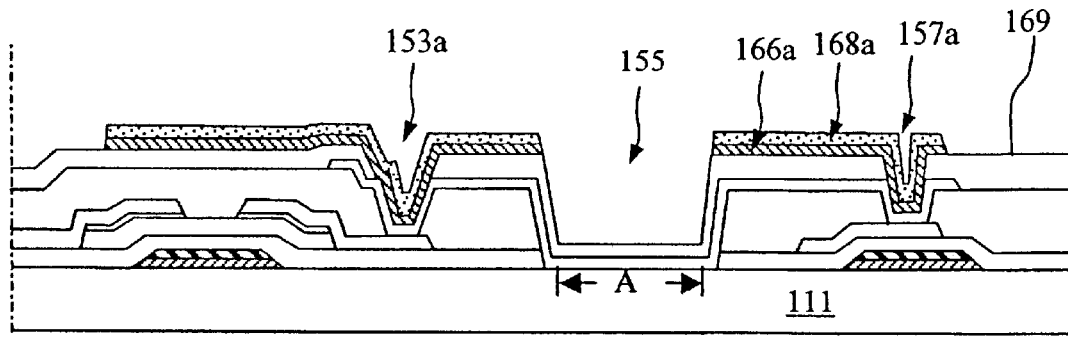
Figure 8F:
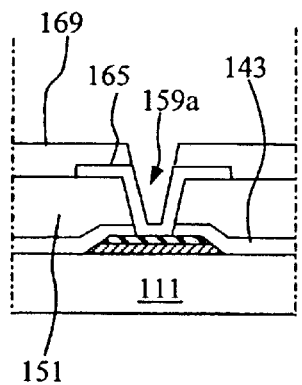
Figure 9F:
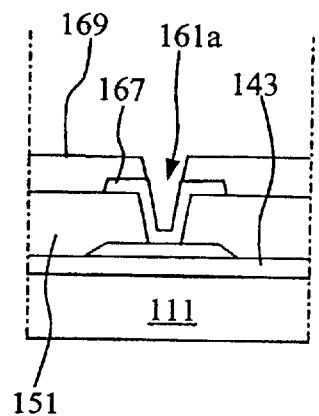

Thereafter, referring to FIGS. 7F, 8F and 9F, molybdenum (Mo) 166 and aluminum-based material 168 are patterned using a mixed etching solution with phosphoric acid, acetic acid and nitric acid, thereby forming a first reflective electrode 166a and a second reflective electrode 168a which have a through-hole "A". The first reflective electrode 166a and the second reflective electrode 168a act together as the reflective electrode 19b of FIG. 4. The first and second reflective electrodes 166a and 168a electrically contact the transparent electrode 119a via the second drain contact hole 153a and second capacitor contact hole 157a such that the first and second reflective electrodes 166a and 168a and the drain electrode 135 are electrically interconnected. Further, the etching hole 155 corresponding to the through-hole "A" is opened to form the transparent portion. Additionally, the gate pad terminal 165 and the data pad terminal 167 are also exposed when forming the first and second reflective electrodes 166a and 168a. Therefore, the array substrate for the LCD device is complete according to the first embodiment of the present invention.

As described before, the additional processes for forming the second gate pad contact hole 159a and second data pad contact hole 161a are not required because these pad contact holes are formed together with the etching hole 155 and second capacitor contact hole 157a, thereby decreasing the manufacturing process and increasing the manufacturing yield. Furthermore, although the gate-insulating layer 143 and the first passivation layer 151 have defects such as cracks or pin-holes, the firstly formed metal layer are not deteriorated due to the fact that the top potion thereof is formed of titanium (Ti) having corrosion-resisting characteristics.

FIGS. 10A to 10D, 11A to 11D and 12A to 12D are sequential cross-sectional views respectively taken along lines X—X, XI—XI and XII—XII of FIG. 3 according to a second embodiment of the present invention. In the second embodiment, the gate line, the gate pad, the gate electrode and the reflective electrode altogether have single-layered structures.

Figure 10A:
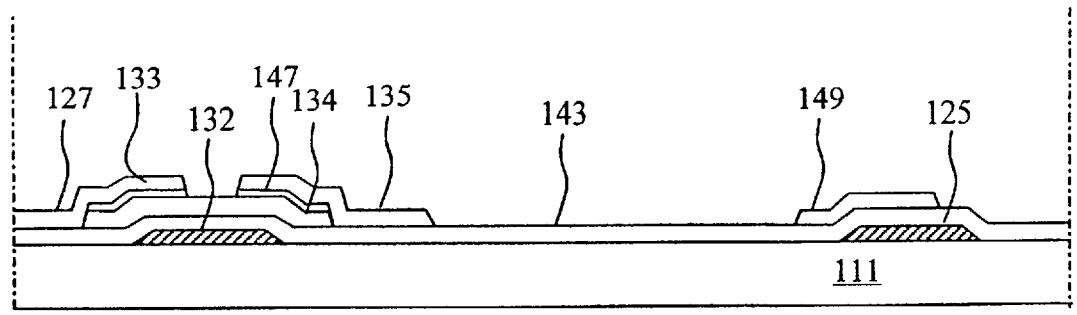
FIGS. 10A to 10D are sequential cross-sectional views taken along line X—X of FIG. 3 according to a second embodiment of the present invention.
Figure 11A:
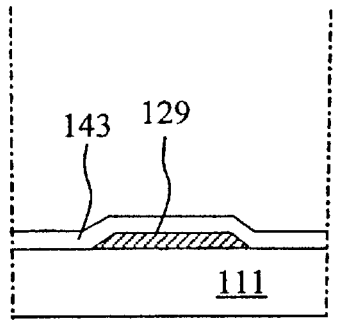
FIGS. 11A to 11D are sequential cross-sectional views taken along line XI—XI of FIG. 3 according to the second embodiment of the present invention.
Figure 12A:
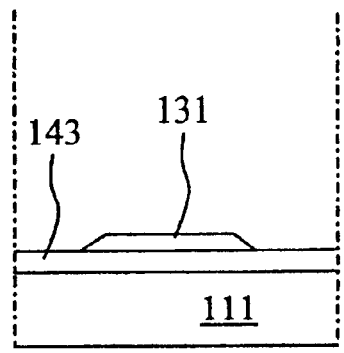
FIGS. 12A to 12D are sequential cross-sectional views taken along line XII—XII of FIG. 3 according to the second embodiment of the present invention.

Referring to FIGS. 10A, 11A and 12A, a first metal is deposited and patterned upon a transparent substrate 111 such that a gate pad 129, a gate line 125, and a gate electrode 132 are formed. As a material for the first metal, aluminum (Al), aluminum neodymium (AlNd), tungsten (W), chromium (Cr) or molybdenum (Mo) is conventionally employed. Alternatively, the gate line 125, gate pad 129 and the gate electrode 132 can have the double-layered structures as described in the first embodiment (in FIGS. 7A, 8A and 9A) of the present invention. The gate line 125 extends from and is connected with the gate pad 129, and the gate electrode 132 protrudes from the gate line 125 (in FIG. 3). Thereafter, a gate-insulating layer 143 is formed on the transparent substrate 111 to cover the metal layer previously formed. The gate-insulating layer 143 may be an inorganic substance, such as silicon nitride ($SiN_x$) or silicon oxide ($SiO_2$). Subsequently, amorphous silicon (a-Si) and impurity-doped amorphous silicon ($n^+/p^+$ a-Si) are formed in series on the gate-insulating layer 143. The amorphous silicon and impurity-doped amorphous silicon are simultaneously patterned into an island shape to form an active layer 134 and an ohmic contact layer 147, respectively. The active layer 134 is formed on the gate-insulating layer 143, particularly over the gate electrode 132, and the ohmic contact layer 147 is formed on the active layer 134. Also, a source electrode 133 and a drain electrode 135 are formed of a second metal on the ohmic contact layer 147. By depositing and patterning this second metal, not only are the source electrode 133 and the drain electrode 135 formed, but the data line 127, a capacitor electrode 149 and a data pad 131 are also formed on the gate-insulating layer 143 such that the source electrode 133 extends from the data line 127. The source electrode 133 and the drain electrode 135 are spaced apart from each other and respectively overlap opposite ends of the gate electrode 132. The capacitor electrode 149 overlaps a portion of the gate line 125 to define the storage capacitor "S" of FIG. 3. Moreover, a portion of the ohmic contact layer 147 between the source electrode 33 and drain electrode 35 is eliminated to form a channel region.

Figure 10B:
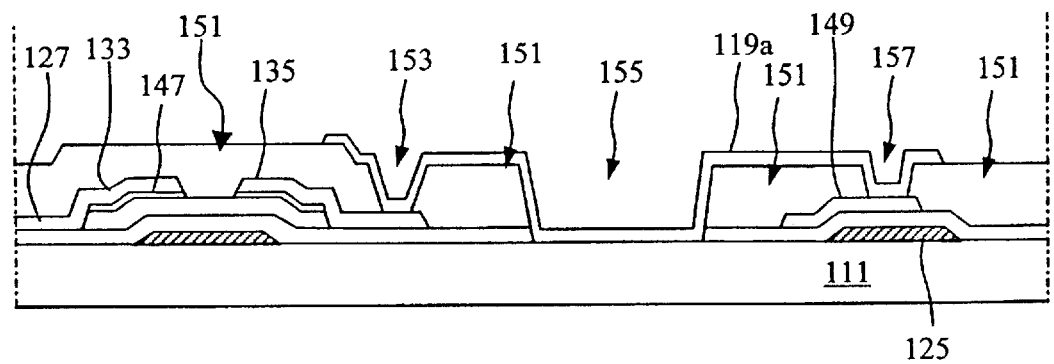
Figure 11B:
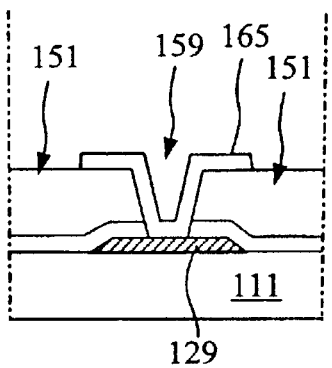
Figure 12B:
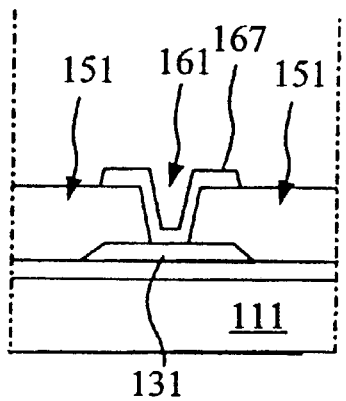

Now referring to FIGS. 10B, 11B and 12B, a first passivation layer 151 is formed on and over the above-mentioned intermediates by depositing an organic substance, such as BCB (benzocyclobutene) or an acryl-based resin, or an inorganic substance, such as silicon oxide or silicon nitride. By patterning the first passivation layer 151, a first drain contact hole 153 that exposes a portion of the drain electrode 135 is formed. At this time, a first capacitor contact hole 157 and a first data pad contact hole 161 are also formed by patterning the first passivation layer 151. Furthermore, by patterning both the first passivation layer 151 and the gate-insulating layer 143, an etching hole 155 corresponding to the through-hole "A" and a first gate pad contact hole 159 are formed. The first capacitor contact hole 157 exposes a portion of the capacitor electrode 149; the first gate pad contact hole 159 exposes a portion of the gate pad 129; and the first data pad contact hole 161 exposes a portion of the data pad 131.

Thereafter, a transparent conductive material, such as indium tin oxide (ITO), indium zinc oxide (IZO) or indium tin zinc oxide (ITZO), is deposited upon the first passivation layer 151 having the holes and subsequently patterned to form a transparent electrode 119a, a gate pad terminal 165 and a data pad terminal 167. The transparent electrode 119a electrically contacts the drain electrode 135 through the first drain contact hole 153, and the gate pad terminal 165 electrically contacts the gate pad 129 through the first gate pad contact hole 159. Additionally, the data pad terminal 167 electrically contacts the data pad 131 through the first data pad contact hole 161. At this point, the transparent electrode 119a preferably overlaps portions of the gate line 125 and contacts the capacitor electrode 149, and thus the transparent electrode 119a and the capacitor electrode 149 acts as a first capacitor electrode in the storage capacitor "S" (in FIG. 3). Further, a portion of the gate line 125 acts as a second capacitor electrode in the storage capacitor "S".

Figure 10C:
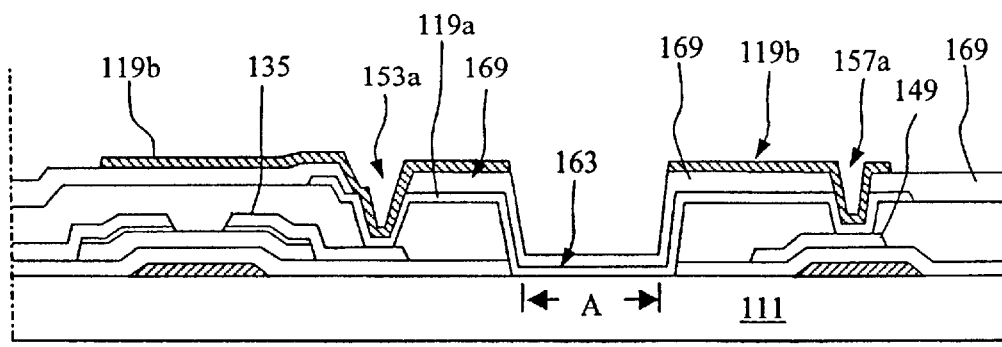
Figure 11C:
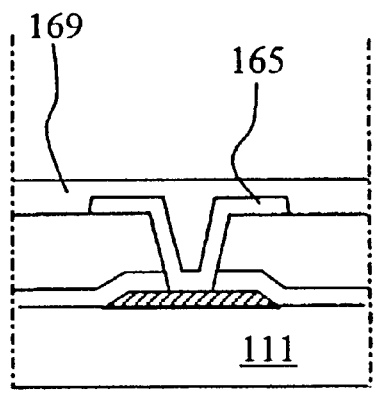
Figure 12C:
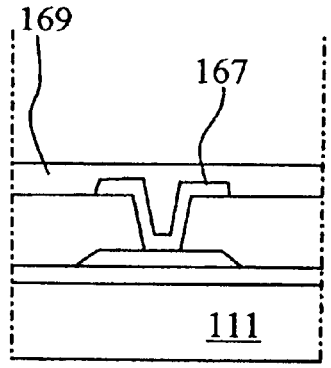

Next, as shown in FIGS. 10C, 11C and 12C, an insulating material such as silicon oxide, for example, is deposited upon the transparent electrode 119a and subsequently patterned to form a second passivation layer 169. The second passivation layer 169 includes a second drain contact hole 153a positioned over the drain electrode 135 and a second capacitor contact hole 157a over the capacitor electrode 149.

Thereafter, a third metal is deposited upon the second passivation layer 169 and subsequently patterned to form a reflective electrode 119b having a through-hole "A". The second metal is preferably aluminum (Al) or aluminum alloy (e.g., aluminum neodymium (AlNd)) which have low resistance and high reflectance properties. Additionally, a photo resist (not shown) is used for patterning the third metal. The reflective electrode 119b electrically contacts the transparent electrode 119a via the second drain contact hole 153a and second capacitor contact hole 157a such that the reflective electrode 119b and the drain electrode 165 are electrically interconnected. Namely, a first portion of the reflective electrode 119b is electrically connected with the drain electrode 135 through the second drain contact hole 153a, and a second portion of the reflective electrode 119b is electrically connected with the capacitor electrode 149 through the second capacitor contact hole 157a.

Figure 10D:
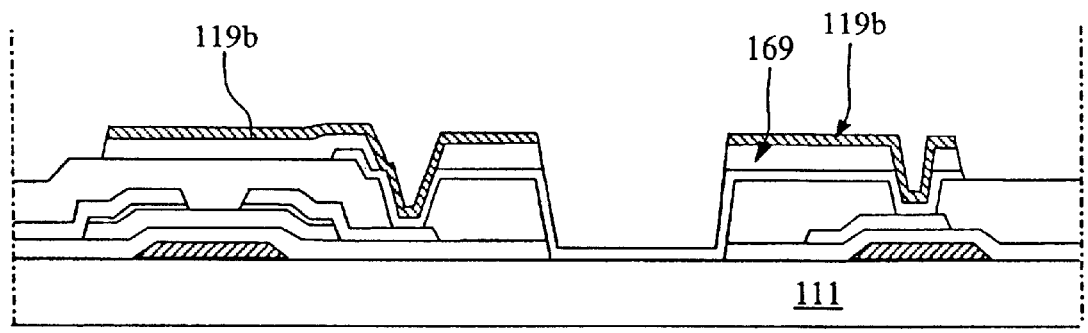
Figure 11D:
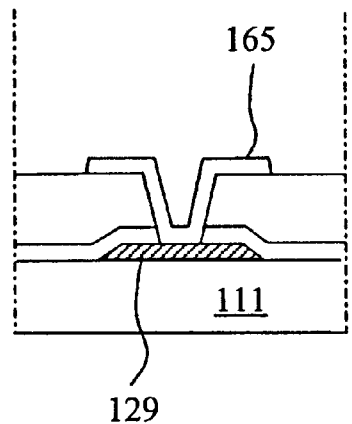
Figure 12D:
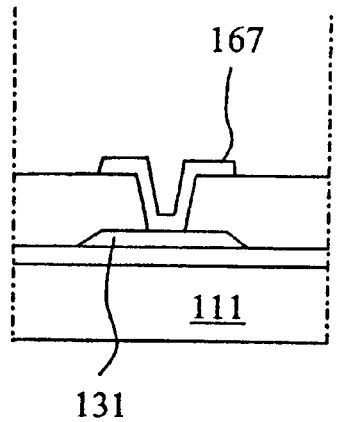

Next, referring to FIGS. 10D, 11D and 12D, exposed portions of the second passivation layer 169 are patterned to exposed the gate pad terminal 165 and data pad terminal 167. At this point, there are two methods of patterning the second passivation layer 169.

In the first method of pattering the second passivation layer 169, the photo resist for forming the reflective electrode 119b is first removed and subsequently etches the exposed second passivation layer 169 using a dry etching method. At this time, the reflective electrode 119b functions as a etch stopper. Therefore, the third metal for the reflective electrode 119b should be very resistant to the dry etching with the low resistance and high reflectance properties.

In the second method of patterning the second passivation layer 169, the exposed second passivation layer 169 is first etched using a dry etching method before removing the photo resist for the reflective electrode 119b. Further in the second method, an ash process is employed to remove the photo resist for the reflective electrode 119b. If the photo resist for the reflective electrode 119b is removed by a wet stipper using a wet etching method, Galvanic corrosion occurs between the reflective electrode 119b and the transparent electrode 119a because the wet stripper is an electrolytic solution. Therefore, when using the ash process for removing the photo resist, Galvanic corrosion does not occur between the reflective electrode 119b and the transparent electrode 119a.

Accordingly, from one of the above-mentioned methods for patterning the second passivation layer 169, the gate pad terminal 165 and the data pad terminal are completely exposed. Additionally, the second passivation layer 169 only remains under the reflective electrode 119b, as shown in FIGS. 10D, 11D and 12D.

In the second embodiment of the present invention, since the second passivation layer is etched using the reflective electrode or photo resist on the reflective electrode as masks, additional mask process is not required to expose the gate and data pad terminals. Therefore, the manufacturing processes are reduced.

Figure 13A:
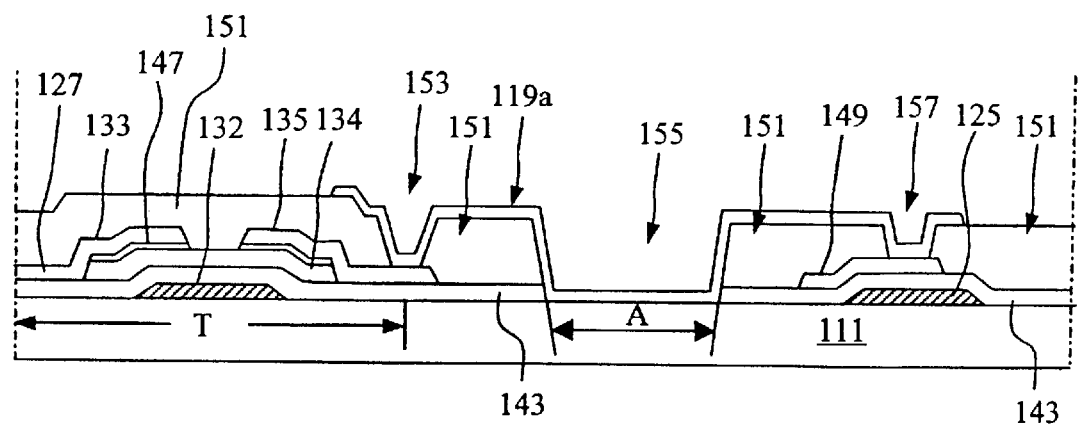
FIGS. 13A to 13C are sequential cross-sectional views taken along line XIII—XIII of FIG. 3 according to a third embodiment of the present invention.
Figure 13B:
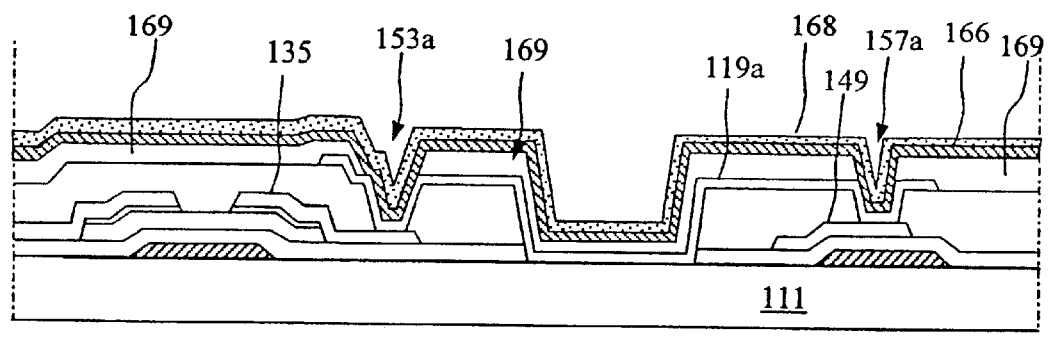
Figure 13C:
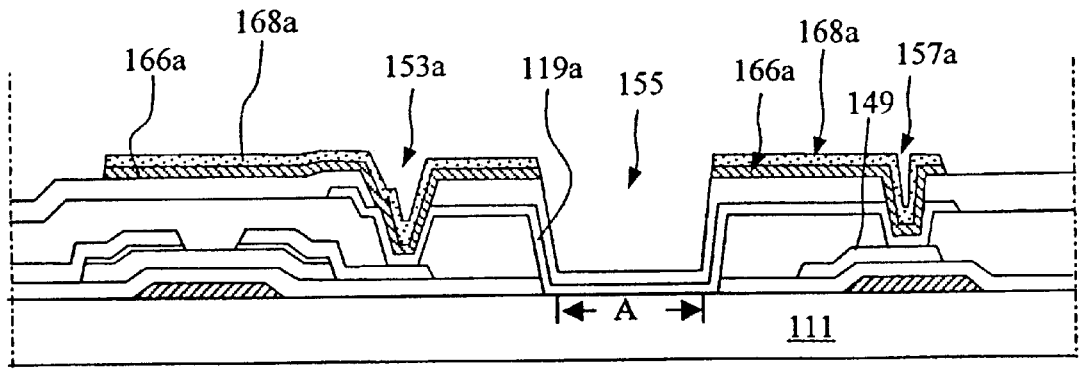
Figure 14A:
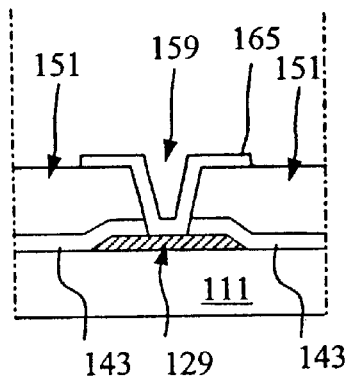
FIGS. 14A to 14C are sequential cross-sectional views taken along line XIV—XIV of FIG. 3 according to the third embodiment of the present invention.
Figure 14B:
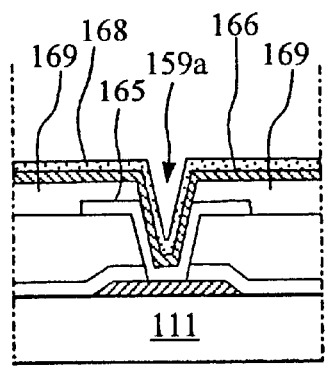
Figure 14C:
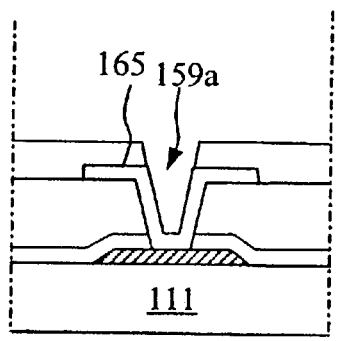
Figure 15A:
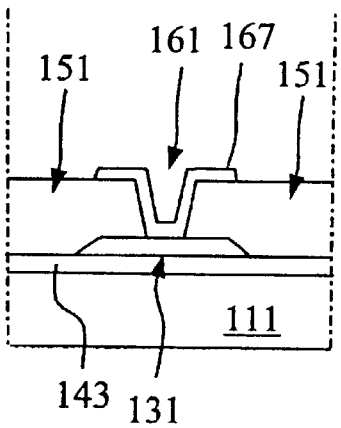
FIGS. 15A to 15C are sequential cross-sectional views taken along line XV—XV of FIG. 3 according to the third embodiment of the present invention.

FIGS. 13A to 13C, 14A to 14C and 15A to 15C are sequential cross-sectional views respectively taken along lines XIII—XIII, XIV—XIV and XV—XV of FIG. 3 according to a third embodiment of the present invention. In the third embodiment, the gate line, the gate pad and the gate electrode altogether have single-layered structures, while the reflective electrode has a double-layered structure. Additionally, since FIGS. 13A, 14A and 15A are the same as FIGS. 10B, 11B and 12B of the second embodiment, the third embodiment of the present invention is briefly described and some explanation of the third embodiment is omitted.

Referring to FIGS. 13A, 14A and 15A, a thin film transistor (TFT) "T" is formed on the substrate 111. The TFT "T" includes a gate line 132, an active layer 134, an ohmic contact layer 147, a source electrode 133 and a drain electrode 135. A gate-insulating layer 143 isolates the gate electrode 132 from the active layer 134 and the source and drain electrodes 133 and 135. A gate line 125 is formed in one direction on the substrate 111, and a gate pad 129 is positioned at the end of the gate line 125. The gate electrode 132 extends from the gate line 125, and the source electrode 133 extends from the data line 127. When forming the source and drain electrodes 133 and 135, a capacitor electrode 149 over the gate line 125 and the data pad 131 are also formed. A first passivation layer 151, such as benzocyclobutene (BCB) or acryl-based resin, covers the TFT "T", the capacitor electrode 149 and the data pad 131. As shown in FIGS. 13A, 14A and 15A, the first passivation layer 151 has a first drain contact hole 153 to the drain electrode 135, a first capacitor contact hole 157 to the capacitor electrode 149, a first gate pad contact hole 159 to the gate pad 129, a first data pad contact hole 161 to the data pad 131, and an etching hole 155 corresponding to a through-hole (i.e., a transmissive portion) "A". A transparent electrode 119a, a gate pad terminal 165 and a data pad terminal 167 are formed on the first passivation layer 151 by patterning the transparent conductive material, such as ITO or IZO. A first portion of the transparent electrode 119a contacts the drain electrode 135 through the first drain contact hole 153, while a second portion of the transparent electrode 119a contacts the capacitor electrode 149 through the first capacitor contact hole 157. The gate pad terminal 165 and the data pad terminal 167 have island shape, and contact the gate pad 129 through the first gate pad contact hole 159 and the data pad 131 through the first data pad contact hole 161, respectively.

Figure 15B:
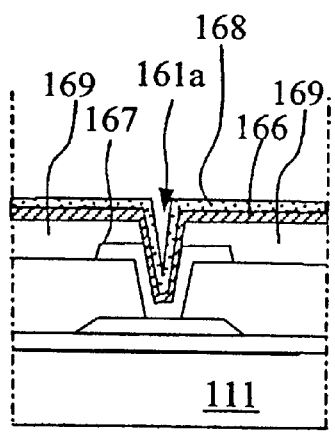

Now, referring to FIGS. 13B, 14B and 15B, an insulating material is deposited upon the transparent electrode 119a and subsequently patterned to form a second passivation layer 169. Here, the insulating material is an inorganic substance, such as silicon oxide or silicon nitride, or an organic substance, such as benzocyclobutene (BCB) or acryl-based resin. The second passivation layer 169 comprises a second drain contact hole 153a positioned over the drain electrode 135 and a second capacitor contact hole 157a positioned over the capacitor electrode 149. At this time, a second gate pad contact hole 159a and a second data pad contact hole 161a are also formed by patterning the second passivation layer 169. The second gate pad contact hole 159a exposes a portion of the gate pad 129, and the second data pad contact hole 161a exposes a portion of the data pad 131.

Thereafter, a corrosion-resistant metal layer (a first layer) 166, such as a chromium (Cr) layer, is formed on the second passivation layer 169 having the second contact holes 153a, 157a, 159a and 161a. Subsequently, aluminum-based layer (a second layer) 168, such as Al or AlNd layer, is formed on the corrosion-resistant metal layer 166. Thereafter, the corrosion-resistant metal layer 166 and aluminum-based layer 168 are patterned using a mixed etching solution with phosphoric acid, acetic acid and nitric acid. If the corrosion-resistant metal layer 166 is formed of chromium (Cr), the etching solution includes a ceric ammonium nitrate solution. Additionally, during this etching process, the corrosion-resistant metal layer 166 protects the gate and data pad terminals 165 and 167 from the etching solution for the aluminum-based layer 168.

From this etching process, formed are a first reflective electrode 166a and a second reflective electrode 168a both having a through-hole "A", as shown in FIG. 13C. The first reflective electrode 166a and the second reflective electrode 168a act together as the reflective electrode 119b of FIG. 10D.

Figure 15C:
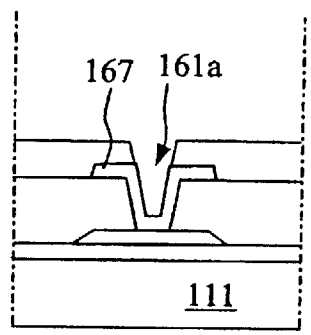

As shown in FIGS. 13C, 14C and 15C, the double-layered reflective electrodes 166a and 168a contact the transparent electrode 119a via the second drain contact hole 153a and second capacitor contact hole 157a such that the double-layered reflective electrodes 166a and 168a and the drain electrode 165 are electrically interconnected. Further, the etching hole 155 corresponding to the through-hole "A" is opened to form the transparent portion. Additionally, the gate pad terminal 165 and the data pad terminal 167 are also exposed when forming the double-layered reflective electrodes 166a and 168a. Therefore, the array substrate for the LCD device is complete according to the third embodiment of the present invention.

In the third embodiment described above, the second layer 168 of the double-layered reflective electrode is first etched, and then the first layer 166 of the double-layered reflective electrode is etched. Namely, aluminum-based layer 168 which causes Galvanic corrosion with the transparent conductive material is etched before etching the corrosion-resistant metal layer 166 which does not cause Galvanic corrosion with the transparent conductive material. Therefore, the gate pad terminal 165 and the data pad terminal 167 are not deteriorated and corroded when forming the double-layered reflective electrode. Furthermore, the additional processes are not required to expose the gate pad terminal 165 and the data pad terminal 167, unlike the conventional art.

Figure 16A:
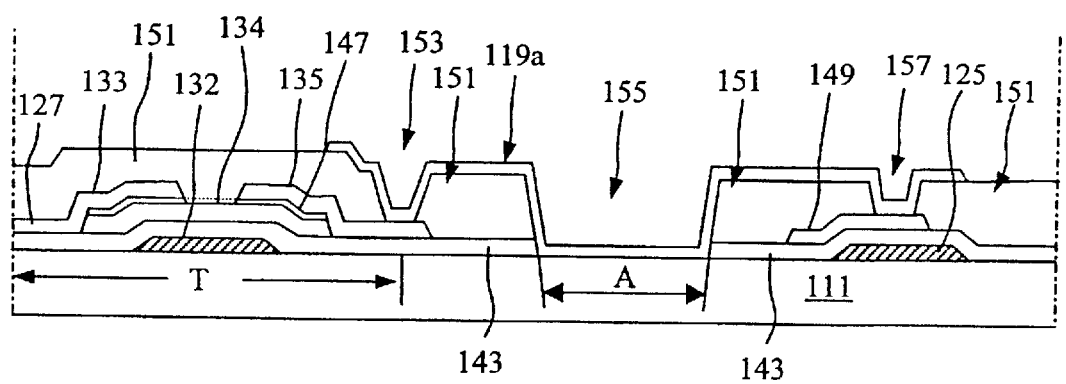
FIGS. 16A to 16C are sequential cross-sectional views taken along line XVI—XVI of FIG. 3 according to a fourth embodiment of the present invention.
Figure 16B:
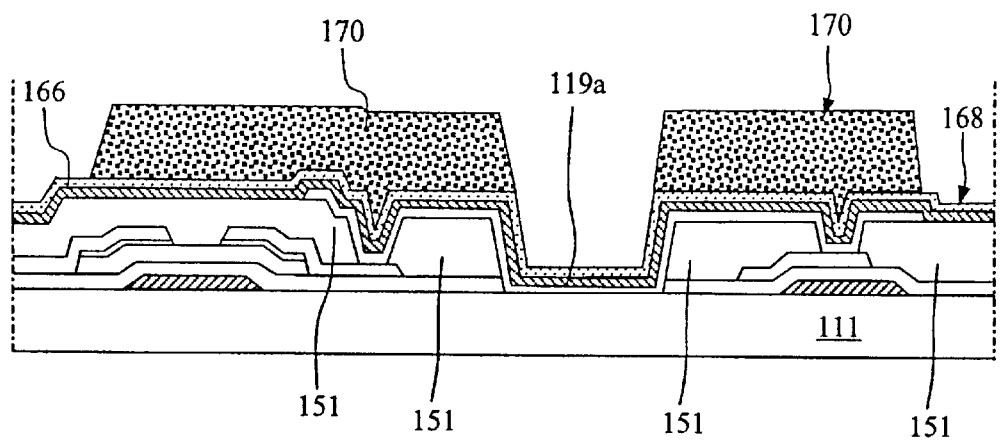
Figure 16C:
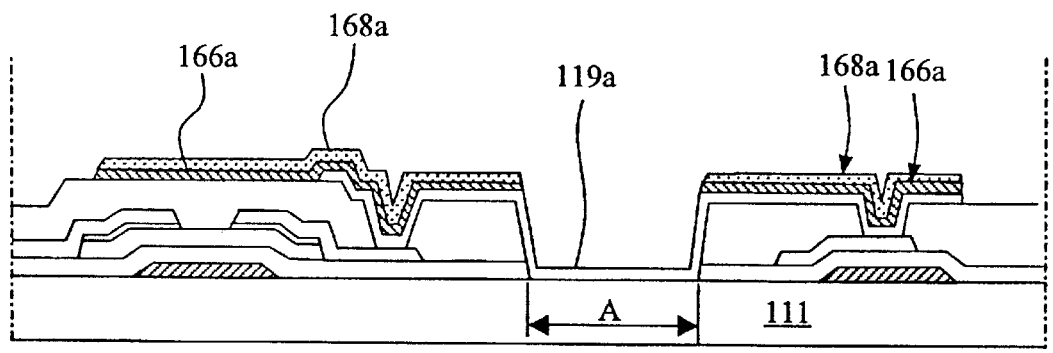
Figure 17A:
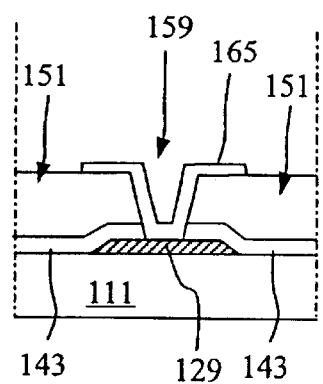
FIGS. 17A to 17C are sequential cross-sectional views taken along line XVII—XVII of FIG. 3 according to the fourth embodiment of the present invention.
Figure 17B:
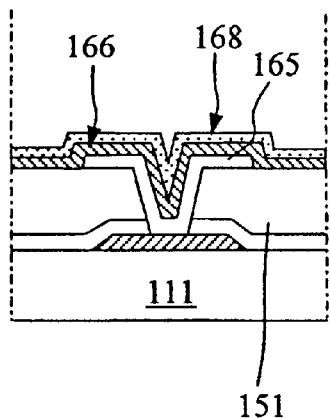
Figure 17C:
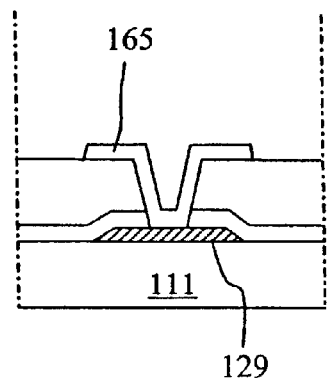
Figure 18A:
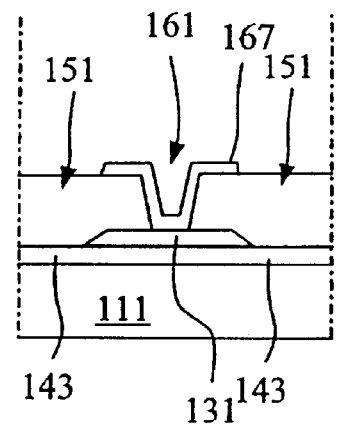
FIGS. 18A to 18C are sequential cross-sectional views taken along line XVIII—XVIII of FIG. 3 according to the fourth embodiment of the present invention.

FIGS. 16A to 16C, 17A to 17C and 18A to 18C are sequential cross-sectional views respectively taken along lines XVI—XVI, XVII—XVII and XVIII—XVIII of FIG. 3 according to a fourth embodiment of the present invention. In the fourth embodiment, the second passivation layer between the transparent electrode and the reflective electrode is not necessary, unlike the conventional art. Additionally, since FIGS. 16A, 17A and 18A are the same as FIGS. 10B, 11B and 12B of the second embodiment, the fourth embodiment of the present invention is briefly described and some explanation of the fourth embodiment is omitted.

Referring to FIGS. 16A, 17A and 18A, a thin film transistor (TFT) "T" is formed on the substrate 111. The TFT "T" includes a gate line 132, an active layer 134, an ohmic contact layer 147, a source electrode 133 and a drain electrode 135. A gate-insulating layer 143 isolates the gate electrode 132 from the active layer 134 and the source and drain electrodes 133 and 135. A gate line 125 is formed in one direction on the substrate 111, and a gate pad 129 is positioned at the end of the gate line 125. The gate electrode 132 extends from the gate line 125, while the source electrode 133 extends from the data line 127. When forming the source and drain electrodes 133 and 135, a capacitor electrode 149 over the gate line 125 and the data pad 131 are also formed. A passivation layer 151, such as benzocyclobutene (BCB) or acryl-based resin, is formed to cover the TFT "T", the capacitor electrode 149 and the data pad 131. As shown in FIGS. 16A, 17A and 18A, the passivation layer 151 has a drain contact hole 153 to the drain electrode 135, a capacitor contact hole 157 to the capacitor electrode 149, a gate pad contact hole 159 to the gate pad 129, a data pad contact hole 161 to the data pad 131, and an etching hole 155 corresponding to a through-hole (i.e., a transmissive portion) "A". A transparent electrode 119a, a gate pad terminal 165 and a data pad terminal 167 are formed on the passivation layer 151 by patterning the transparent conductive material, such as ITO or IZO. A first portion of the transparent electrode 119a contacts the drain electrode 135 through the drain contact hole 153, while a second portion of the transparent electrode 119a contacts the capacitor electrode 149 through the capacitor contact hole 157. The gate pad terminal 165 and the data pad terminal 167 have island shape, and contact the gate pad 129 through the first gate pad contact hole 159 and the data pad 131 through the first data pad contact hole 161, respectively.

Figure 18B:
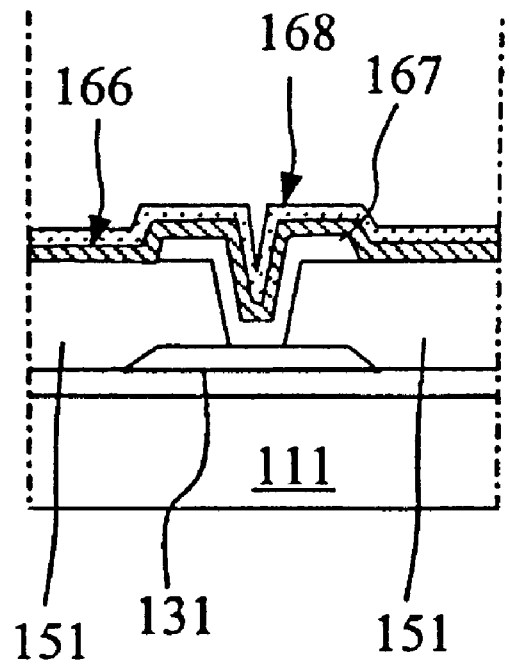

Now, referring to FIGS. 16B, 17B and 18B, a corrosion-resistant metal layer (a first layer) 166, such as a chromium (Cr) or molybdenum (Mo) layer, is formed on the passivation layer 151 to cover the patterned transparent conductive material. Subsequently, aluminum-based layer (a second layer) 168, such as Al or AlNd layer, is formed on the corrosion-resistant metal layer 166. Therefore, a double-layered structure is complete for the double-layered reflective electrode.

Thereafter, a photolithography process is performed as follows. First, a photo resist is formed on the second layer 168 and exposed to the light. The light-exposed portions of the photo resist is stripped to form a photo resist pattern 170, thereby exposing the second layer 168 except for a portion for reflective electrode.

When removing the exposed portion of the second layer (the aluminum-based layer) 168, a mixed etching solution including phosphoric acid, acetic acid and nitric acid is used. However, when removing the first layer (the corrosion-resistant metal layer, e.g., chromium or molybdenum) 166 to form the double-layered reflective layer, a mixed solution with a ceric ammonium nitrate solution and nitric acid is used as an etching solution.

In this fourth embodiment of the present invention, the first layer 166 should be thick enough to protect the transparent conductive material therebelow from the mixed etching solution for the second layer 168. Namely, the first layer 166 prevents the etching solution for the second layer 168 from affecting the transparent electrode 119a, gate pad terminal 165 and data pad terminal 167. The first layer 166 formed of Cr or Mo does not cause Galvanic corrosion with the transparent conductive material (e.g., ITO or IZO), thereby not deteriorating the electrode 119a and terminals 165 and 167 formed of transparent conductive material when etching the first layer 166.

Accordingly, since the first layer 166 and the second layer 168 are etched respectively in the fourth embodiment of the present invention, Galvanic corrosion does not occur between the aluminum-based layer 168 and the layers formed of transparent conductive material. Furthermore, although chromium and molybdenum are mentioned for the first layer 166 in this reference, other metal layers that do not corrosively reacts with the transparent conductive material can be employed as a first layer 166.

Figure 18C:
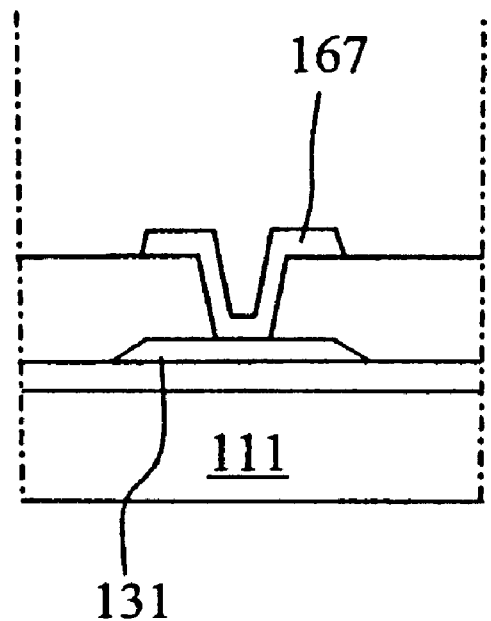

FIGS. 16C, 17C and 18C are cross-sectional views showing an array substrate according to the present invention after forming the double-layered reflective electrode 166a and 168a. In accordance with the fourth embodiment of the present invention, since the double-layered reflective electrode 166a and 168a is formed on and contacts the transparent electrode 119a, some additional processes may be required. Namely, the processes for removing the defects may be necessary because the electrons may be trapped in the interface between the transparent electrode 119 and the first layer 166a of the reflective electrode and these trapped electrons cause the defects. In order to overcome this problem, the transparent electrode 119a is laser-treated to improve electrical and optical characteristics thereof.

Although the reflective electrode has the double-layered structure in the fourth embodiment of the present invention, a single-layered structure can be employed in the reflective electrode. At this point, the reflective electrode is relatively thicker than the conventional art, and a dry etching method is used for patterning the thick reflective electrode. Namely, the opaque metal having high reflectance is deposited on the transparent electrode, and then the photolithography process proceeds using a photo resist. At this time, half of the thick opaque metal layer, which is exposed for etching, is removed by the dry etching method. Thereafter, the photo resist patterned for the reflective electrode is stripped completely. Although the wet stripper for the photo resist is an electrolytic solution, the transparent electrode and pad terminals are not affected by this wet stripper because half-etched opaque metal layer covers the transparent electrode and pad terminals. After stripping the photo resist, the half-etched opaque metal layer is removed using the dry etching method. At this time, a portion of the opaque metal layer where the photo resist pattern remained becomes the reflective electrode. Although the portion for reflective electrode is half-etched, this properly functions as a reflective electrode.

In the fourth embodiment of the present invention, the second passivation layer is not formed on the patterned transparent conductive material, and the reflective electrode is directly disposed on the transparent electrode. Since the second passivation layer is omitted, the manufacturing processes are reduced in the fourth embodiment. Additionally, although the reflective electrode is formed on the surface of the transparent electrode, Galvanic corrosion does not occur in the fourth embodiment of the present invention.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for use in a transflective liquid crystal display device, the method comprising the steps of:
    forming a gate line, a gate electrode and a gate pad all having a first layer and a second layer structure on a substrate;
    forming a gate-insulating layer on the substrate to cover the double-layered gate line, the double-layered gate electrode and the double-layered gate pad;
    forming an active layer and an ohmic contact layer over the gate electrode; forming a data line, source and drain electrodes on the ohmic contact layer, a capacitor electrode over the gate line and a data pad at the end of the data line;
    forming a first passivation layer to cover the data line, source and drain electrodes, the capacitor electrode and the data pad, the first passivation layer having a first drain contact hole to the drain electrode, a etching hole corresponding to a transmissive portion, a first capacitor contact hole to the capacitor electrode, a first gate pad contact hole to the gate pad, and a data pad contact hole to the data pad;
    forming a gate pad terminal, a data pad terminal and a transparent electrode in the transmissive portion, the gate pad terminal contacting the gate pad through the first gate pad contact hole, the data pad terminal contacting the data pad through the first data pad contact hole, and transparent electrode contacting the drain electrode and capacitor electrode through the first drain and capacitor contact holes;
    forming a second passivation layer to cover the transparent electrode, the gate pad terminal and the data pad terminal, the second passivation layer having a second drain contact hole over the drain electrode, a second capacitor contact hole over the capacitor electrode, a second gate pad contact hole over the gate pad, and a second data pad contact hole over the data pad;
    forming a corrosion-resistant metal layer on the second passivation layer; forming an aluminum-based layer on the corrosion-resistant metal layer; and
    patterning the aluminum-based layer and the corrosion-resistant metal layer so as to form a double-layered reflective electrode and expose the gate pad terminal and data pad terminal.

2. The method of claim 1, wherein the first layers of the gate line, gate electrode and gate pad are one of aluminum or aluminum neodymium.

3. The method of claim 1, wherein the second layers of the gate line, gate electrode and gate pad are titanium.

4. The method of claim 1, wherein the data line, source and drain electrodes, capacitor electrode and data pad are formed of chromium.

5. The method of claim 1, wherein the gate pad terminal, data pad terminal and transparent electrode are formed of a transparent conductive material selected from a group consisting of indium tin oxide, indium zinc oxide and indium tin zinc oxide.

6. The method of claim 1, wherein the corrosion-resistant metal is molybdenum.

7. The method of claim 1, wherein the aluminum-based layer is aluminum neodymium.

8. The method of claim 1, wherein the aluminum-based layer is pure aluminum.

9. A method of fabricating an array substrate for use in a transflective liquid crystal display device, the method comprising the steps of:

forming a gate line, a gate electrode and a gate pad all having a single-layered structure on a substrate;

forming a gate-insulating layer on the substrate to cover the gate line, the gate electrode and the gate pad;

forming an active layer and an ohmic contact layer over the gate electrode; forming a data line, source and drain electrodes on the ohmic contact layer, a capacitor electrode over the gate line, and a data pad at the end of the data line, thereby defining intermediate structures;

forming a first passivation layer to cover the intermediate structures, the first passivation layer having a first drain contact hole to the drain electrode, a etching hole corresponding to a transmissive portion, a first capacitor contact hole to the capacitor electrode, a gate pad contact hole to the gate pad, and a data pad contact hole to the data pad;

forming a gate pad terminal, a data pad terminal and a transparent electrode in the transmissive portion, the gate pad terminal contacting the gate pad through the gate pad contact hole, the data pad terminal contacting the data pad through the first data pad contact hole, and transparent electrode contacting the drain electrode and capacitor electrode through the first drain and capacitor contact holes;

forming a second passivation layer to cover the transparent electrode, the gate pad terminal and the data pad terminal, the second passivation layer having a second drain contact hole over the drain electrode and a second capacitor contact hole over the capacitor electrode;

forming a reflective electrode having the transmissive portion on the second passivation layer; and patterning the second passivation layer using a dry etching method so as to expose the gate pad terminal and the data pad terminal.

10. The method of claim 9, wherein the gate line, gate electrode and gate pad are formed of a material selected from a group consisting of aluminum, aluminum neodymium, tungsten, chromium and molybdenum.

11. The method of claim 9, wherein the first passivation layer is formed of is a material selected from a group consisting of silicon oxide, silicon nitride, benzocyclobutene and acryl-based resin.

12. The method of claim 9, wherein the gate pad terminal, data pad terminal and transparent electrode are formed of a transparent conductive material selected from a group consisting of indium tin oxide, indium zinc oxide and indium tin zinc oxide.

13. The method of claim 9, wherein the second passivation layer is formed of silicon oxide.

14. The method of claim 9, wherein the second passivation layer is formed of silicon nitride.

15. The method of claim 9, wherein the reflective electrode is formed of an aluminum-based resin selected from a group consisting of aluminum and aluminum-based material.

16. The method of claim 9, wherein the patterning the second passivation layer uses the reflective electrode as a mask.

17. The method of claim 9, wherein the patterning the second passivation layer uses a photo resist for the reflective electrode as a mask.

18. The method of claim 17, wherein the photo resist is removed using an ash process.

19. A method of fabricating an array substrate for use in a transflective liquid crystal display device, the method comprising the steps of:

forming a gate line, a gate electrode and a gate pad on a substrate; forming a gate-insulating layer on the substrate to cover the gate line, the gate electrode and the gate pad;

forming an active layer and an ohmic contact layer over the gate electrode; forming a data line, source and drain electrodes on the ohmic contact layer, a capacitor electrode over the gate line, and a data pad at the end of the data line, thereby defining first intermediate structures;

forming a first passivation layer to cover the first intermediate structures, the first passivation layer having a first drain contact hole to the drain electrode, a etching hole corresponding to a transmissive portion, a first capacitor contact hole to the capacitor electrode, a first gate pad contact hole to the gate pad, and a first data pad contact hole to the data pad;

forming a gate pad terminal, a data pad terminal and a transparent electrode in the transmissive portion, the gate pad terminal contacting the gate pad through the first gate pad contact hole, the data pad terminal contacting the data pad through the first data pad contact hole, and transparent electrode contacting the drain electrode and capacitor electrode through the first drain and capacitor contact holes, thereby defining second intermediate structures;

forming a second passivation layer to cover the second intermediate structures, the second passivation layer having a second drain contact hole over the drain electrode, a second capacitor contact hole over the capacitor electrode, a second gate pad contact hole over the gate pad, and a second data pad contact hole over the data pad;

forming a corrosion-resistant metal layer on the second passivation layer;

forming an aluminum-based layer on the corrosion-resistant metal layer;

patterning the aluminum-based layer so as to form a second layer of a double-layered reflective electrode having a transmissive portion; and pattering the corrosion-resistant metal layer so as to form a first layer of the double-layered reflective electrode having the transmissive portion.

20. The method of claim 19, wherein the first passivation layer is formed of one of benzocyclobutene and acryl-based resin.

21. The method of claim 19, wherein the gate pad terminal, data pad terminal and transparent electrode are formed of a transparent conductive material selected from a group consisting of indium tin oxide and indium zinc oxide.

22. The method of claim 19, wherein the second passivation layer is formed of is a material selected from a group consisting of silicon oxide, silicon nitride, benzocyclobutene and acryl-based resin.

23. The method of claim 19, wherein the corrosion-resistant metal layer is chromium.

24. The method of claim 19, wherein the aluminum-based layer is one of aluminum and aluminum neodymium.

25. The method of claim 19, wherein pattering the aluminum-based layer uses a mixed etching solution with phosphoric acid, acetic acid and nitric acid.

26. The method of claim 19, wherein patterning the corrosion-resistant metal layer uses a ceric ammonium nitrate solution.

27. A method of fabricating an array substrate for use in a transflective liquid crystal display device, the method comprising the steps of:

forming a gate line, a gate electrode and a gate pad on a substrate; forming a gate-insulating layer on the substrate to cover the gate line, the gate electrode and the gate pad;

forming an active layer and an ohmic contact layer over the gate electrode; forming a data line, source and drain electrodes on the ohmic contact layer, a capacitor electrode over the gate line, and a data pad at the end of the data line, thereby defining first intermediate structures;

forming a passivation layer to cover the first intermediate structures, the passivation layer having a drain contact hole to the drain electrode, a etching hole corresponding to a transmissive portion, a capacitor contact hole to the capacitor electrode, a gate pad contact hole to the gate pad, and a data pad contact hole to the data pad;

forming a gate pad terminal, a data pad terminal and a transparent electrode in the transmissive portion, the gate pad terminal contacting the gate pad through the gate pad contact hole, the data pad terminal contacting the data pad through the data pad contact hole, and transparent electrode contacting the drain electrode and capacitor electrode through the drain and capacitor contact holes, thereby defining second intermediate structures;

laser-treating the transparent electrode;

forming a corrosion-resistant metal layer to cover the second intermediate structures; forming an aluminum-based layer on the corrosion-resistant metal layer;

patterning the aluminum-based layer so as to form a second layer of a double-layered reflective electrode having a transmissive portion; and pattering the corrosion-resistant metal layer so as to form a first layer of the double-layered reflective electrode having the transmissive portion.

28. The method of claim 26, wherein the transparent electrode is one of indium tin oxide and indium zinc oxide.

29. The method of claim 26, wherein the corrosion-resistant metal layer is one of chromium and molybdenum.

30. The method of claim 26, wherein the aluminum-based layer is one aluminum and aluminum neodymium.

31. The method of claim 26, wherein pattering the aluminum-based layer uses a mixed etching solution with phosphoric acid, acetic acid and nitric acid.

32. The method of claim 26, wherein pattering the corrosion-resistant metal layer uses a ceric ammonium nitrate solution.

33. A method of fabricating an array substrate for use in a transflective liquid crystal display device, the method comprising the steps of:

forming a gate line, a gate electrode and a gate pad on a substrate; forming a gate-insulating layer on the substrate to cover the gate line, the gate electrode and the gate pad;

forming an active layer and an ohmic contact layer over the gate electrode; forming a data line, source and drain electrodes on the ohmic contact layer, a capacitor electrode over the gate line, and a data pad at the end of the data line, thereby defining first intermediate structures;

forming a passivation layer to cover the first intermediate structures, the passivation layer having a drain contact hole to the drain electrode, a etching hole corresponding to a transmissive portion, a capacitor contact hole to the capacitor electrode, a gate pad contact hole to the gate pad, and a data pad contact hole to the data pad;

forming a gate pad terminal, a data pad terminal and a transparent electrode in the transmissive portion, the gate pad terminal contacting the gate pad through the gate pad contact hole, the data pad terminal contacting the data pad through the data pad contact hole, and transparent electrode contacting the drain electrode and capacitor electrode through the drain and capacitor contact holes, thereby defining second intermediate structures;

laser-treating the transparent electrode;

forming a reflective metal layer to cover the second intermediate structures, the reflective metal layer having a enough thickness;

forming a photo resist on the reflective metal layer; patterning the photo resist using a photolithography process to expose potions of the reflective metal layer;

etching half of the exposed reflective metal layer;

removing the photo resist completely using a wet stripper; and etching the residual reflective metal layer so as to form a reflective electrode.

34. The method of claim 32, wherein the transparent electrode is one of indium tin oxide and indium zinc oxide.

35. The method of claim 32, wherein the reflective metal layer is one aluminum and aluminum neodymium.

* * * * *